United States Patent
Davis et al.

(10) Patent No.: US 10,346,342 B1
(45) Date of Patent: Jul. 9, 2019

(54) UNIFORM MEMORY ACCESS ARCHITECTURE

(71) Applicant: Amazon Technologies, Inc., Seattle, WA (US)

(72) Inventors: Mark Bradley Davis, Austin, TX (US); Thomas A. Volpe, Austin, TX (US); Nafea Bshara, San Jose, CA (US); Yaniv Shapira, Bet Itzhak (IL); Adi Habusha, Moshav Alonei Abba (IL)

(73) Assignee: Amazon Technologies, Inc., Seattle, WA (US)

( * ) Notice: Subject to any disclaimer, the term of this patent is extended or adjusted under 35 U.S.C. 154(b) by 28 days.

(21) Appl. No.: 15/451,982

(22) Filed: Mar. 7, 2017

(51) Int. Cl.
 *G06F 13/42* (2006.01)
 *G06F 13/16* (2006.01)
 *G06F 13/40* (2006.01)

(52) U.S. Cl.
 CPC ...... *G06F 13/4265* (2013.01); *G06F 13/1668* (2013.01); *G06F 13/4068* (2013.01)

(58) Field of Classification Search
 None
 See application file for complete search history.

(56) References Cited

PUBLICATIONS

Dan Hurlimann; Power8 Hardware; Jun. 2014; 70 pages.

*Primary Examiner* — Idriss N Alrobaye
*Assistant Examiner* — Dayton Lewis-Taylor
(74) *Attorney, Agent, or Firm* — Kilpatrick Townsend & Stockton LLP

(57) ABSTRACT

A plurality of system on chips (SoCs) in a server computer can be coupled to a plurality of memory agents (MAs) via respective Serializer/Deserializer (SerDes) interfaces. Each of the plurality of MAs can include one or more memory controllers to communicate with a memory coupled to the respective MA, and globally addressable by each of the SoCs. Each of the plurality of SoCs can access the memory coupled to any of the MAs in uniform number of hops using the respective SerDes interfaces. Different types of memories, e.g., volatile memory, persistent memory, can be supported.

20 Claims, 10 Drawing Sheets

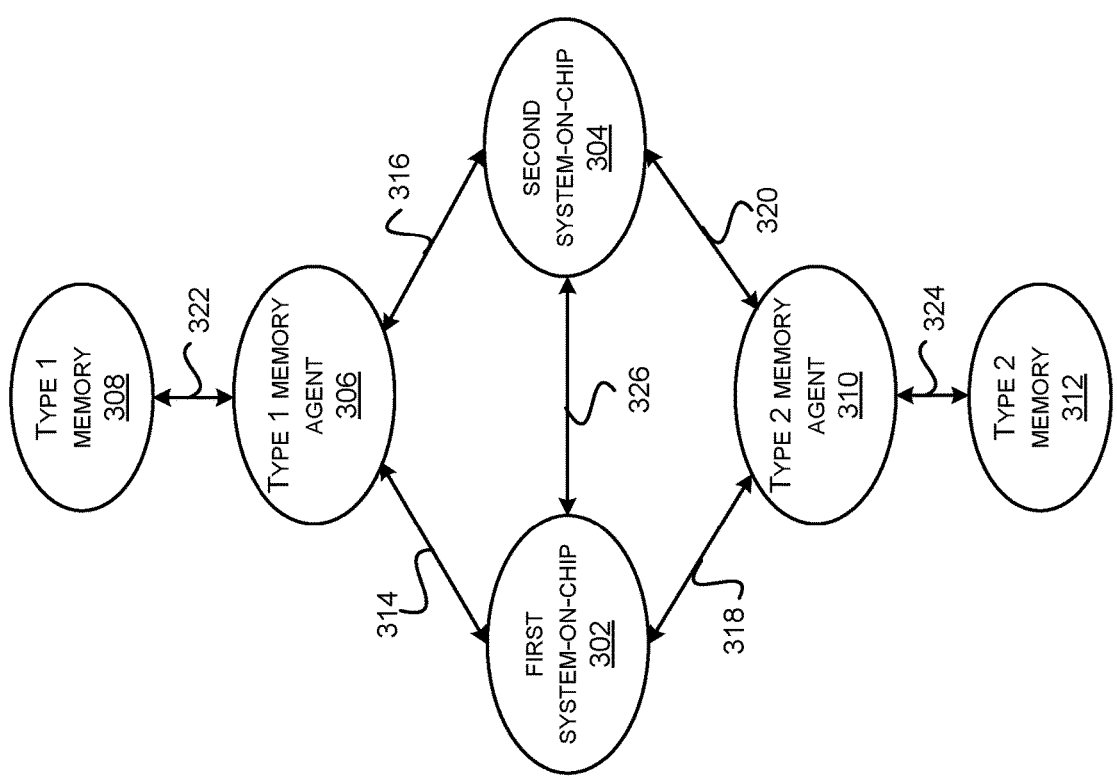

UNIFORM MEMORY ACCESS ARCHITECTURE

BACKGROUND

Many organizations or companies use server computers to provide services such as cloud computing, analytics, web services, storage, databases, applications, deployment services, etc. to a potentially larger number of client computers. The clients can use these services to power a wide variety of workloads such as storage, data processing and warehousing, executing of web and mobile applications, archiving and many other tasks. The demand for higher processing power as well as memory capacity and performance is constantly rising for both the client computers and the server computers.

Server computers generally utilize multiple sockets to house multiple system on chips (SoCs) to support higher processing power. Each SoC may include multiple processors and integrated memory controllers to access memory coupled to the SoC. In many instances, multi-socket server computers are based on respective non-uniform memory access (NUMA) architecture and face several limitations. For example, in a server computer based on NUMA architecture, memory latency may vary for different SoCs based on whether the memory is local, or one or more hops away from an SoC trying to access the memory. Thus, in most instances, the multi-socket server computers based on the NUMA architecture may not be able to provide uniform access to the memory to each of the processors on each of the SoCs. Also, if an SoC fails or switches to low power mode, the memory associated with that SoC may not be available to other socket processors.

Additionally, as the number of memory controllers are increased in each of the SoCs to keep up with the increasing demand for higher memory capacity in the multi-socket server computers, the number of pins on the SoC package and the physical routing of the memory channels on a printed circuit board (PCB) to support the higher number of memory controllers can be a challenge. In most instances, the multi-socket server computers may not be able to support the higher memory capacity without increasing the number of pins on the SoC package or adding complexity in the PCB layout.

BRIEF DESCRIPTION OF THE DRAWINGS

Various embodiments in accordance with the present disclosure will be described with reference to the drawings, in which:

FIG. 3 illustrates an apparatus for a multi-socket server computer configured to support two types of memories, in one embodiment of the disclosed technologies.

DETAILED DESCRIPTION

Figure 1:
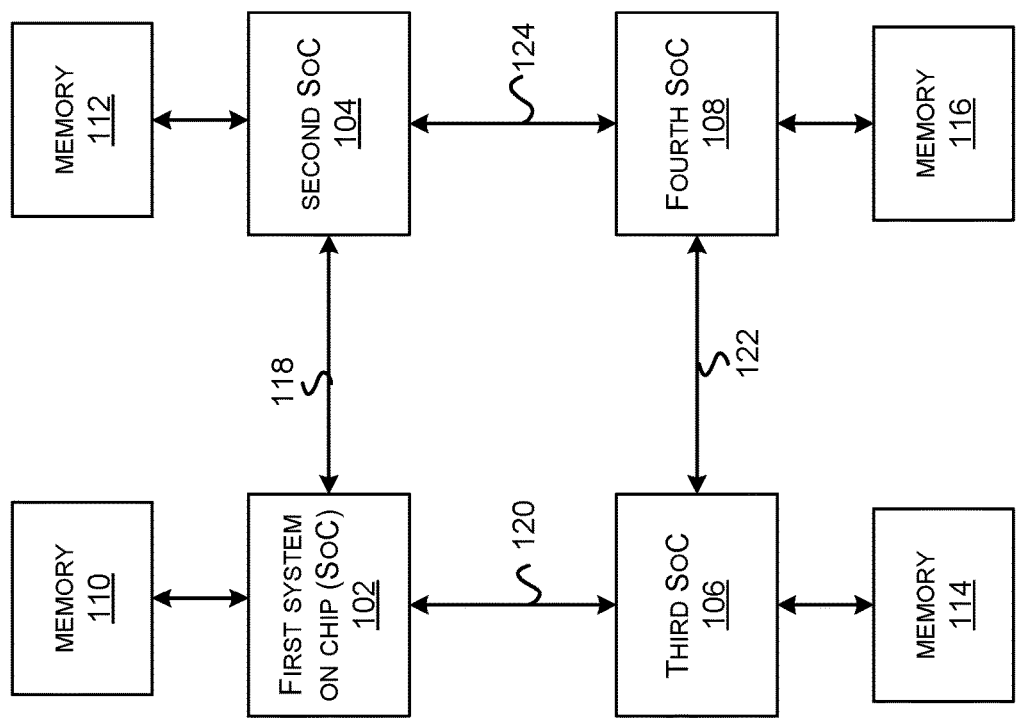
FIG. 1 illustrates an example architecture for a conventional multi-socket server computer.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

In conventional multi-socket server computers, each socket generally includes a system on chip (SoC) comprising multiple processors and an integrated memory controller to access memory coupled to the respective SoC. A unified coherent address space can be maintained through a coherency protocol across an inter-socket interconnect, e.g., HyperTransport by AMD® or QuickPath Interconnect (QPI) by Intel®. However, the conventional multi-socket server computer architecture faces several limitations.

A first limitation may result from non-uniformity of memory latencies across the memories coupled to each of the SoCs. For example, to an application running on a multi-socket server computer, all of the physical memory may seem accessible using coherency protocols; however, the memory accesses may include non-uniform memory accesses (NUMA). For example, a processor from an SoC may be able to access its local memory (i.e. memory coupled directly to the SoC) faster than the memory coupled to other SoCs. Thus, performance of the application may vary dramatically due to the non-uniform memory latency based on whether the memory is local or, one or more hops away. Hence performance sensitive applications as well as operating system (OS) kernels have to become NUMA aware by requesting initiation or relocation of allocated memory such that the memory is locally accessible by code executing on any given SoC. Such accounting for non-uniformity of memory latencies by the applications and OS kernels inadvertently increases complexity of the application and/or the OS. In some instances, non-uniformity of the memory latency can also apply to non-uniformity of bandwidth for accesses to memories attached to different SoCs.

A second limitation may be associated with page migration between memories by NUMA aware applications and/or OS kernel. For example, in some instances, applications or operating systems executing on an SoC may migrate pages to memory attached to the respective SoC (e.g., local memory) from the memories attached to other SoCs that are one or more hops away to improve performance. Such page migration to the local memory can result in decreased performance due to latency introduced by page migration between the memories attached to the various SoCs and the consumed memory bandwidth.

A third limitation may be due to unavailability of an SoC coupled to a bank of memory. For example, in some instances, an SoC may have failed or may be in low power state for power optimization. Thus, when an SoC becomes unavailable, memory attached to that SoC may not be available to other SoCs, resulting in lost access to that bank of memory.

A fourth limitation may be physical design and packaging constraints of physical routing of multiple memory channels and the pin count on each of the SoCs with an increase in memory capacity. For example, as the number of memory controllers are increased in the SoCs to keep up with the increasing demand for higher memory capacity in the server computers, physical routing of the memory channels on a printed circuit board (PCB) to support the higher number of memory modules can be a challenge. In addition, since each memory controller may consume a large number of pins on the SoC (e.g., a couple hundred pins for each dual data rate (DDR) channel), increasing the number of memory controllers for an SoC may result in exponentially increasing complexity and cost to support additional memory channels. Thus, conventional multi-socket server computers may face several limitations, and may not provide a scalable architecture without adding complexity in the hardware or the software components of the server computer.

Various embodiments of the disclosed technologies can overcome the problems faced by the multi-socket server computers based on non-uniform memory access (NUMA) architecture as discussed above. In certain embodiments, a plurality of system on chips (SoCs) can be coupled to a plurality of memory agents (MAs) to provide uniform accesses to respective memory attached to each of the MAs. Each SoC can include one or more processors, and can communicate with each MA using a respective point-to-point interconnect. For example, the point-to-point interconnect may include a Serializer/Deserializer (SerDes) link or any suitable high speed serial link. In certain embodiments, each SoC, once configured, can have a dedicated SerDes interface and a dedicated serial link to communicate with each of the MAs. Thus, any of the memory connected to any of the MAs can be accessed by any of the SoCs in a single hop. For example, a single hop may represent a direct link between each SoC and each MA, e.g., over a SerDes link. Providing direct access to each MA from each of the SoCs can enable uniform latency to any portion of the physical memory attached to any of the MAs. The SerDes interface can provide higher bandwidth for access to the memory and low pin count for each SoC. Each MA can include one or more memory controllers to communicate with the memory attached to the respective MA. Some embodiments can provide uniform latency and uniform bandwidth for all memory accesses by each of the SoCs via any of the MAs using the respective SerDes interface. Latency for a memory access by an SoC may refer to a period of time for completion of a read or write to a memory location by the SoC. Bandwidth may refer to an amount of data that can be transferred over a communication channel between the SoC and the memory during a given period of time.

In some embodiments, the plurality of SoCs can access different types or classes of memories via MAs specific to those types or classes of memories. For example, the different types or classes of memories may include volatile memory, non-volatile memory or persistent memory. In certain embodiments, for each type or class of memory the SoC may include a pre-configured or reconfigurable SerDes interface that can specifically be configured for the respective memory type or class.

Each SerDes interface may include a parallel-in-serial-out (PISO) module to serialize the data (e.g., convert data from a parallel interface to a serial interface) to be sent over a communication link. For example, the parallel data may be associated with a transaction request for a read or write access of a memory coupled to the MA. Each SerDes interface may also include a serial-in-parallel-out (SIPO) module to de-serialize the data (e.g., convert data from a serial interface into a parallel interface) received over the communication link. The communication link may be a serial link that may be referred to as a SerDes link. The SerDes link may be configured to operate at a certain clock frequency and with a certain number of lanes. In certain embodiments, use of a multi-lane SerDes interface between each SoC and each MA can drastically reduce the total pin count as compared to the conventional multi-socket servers by not connecting memory modules to the SoCs directly. The multi-lane SerDes interface can be configured for different clock frequencies or number of lanes for different memory agents corresponding to different memory types. In addition, use of a multi-lane SerDes interface between each SoC and each MA can provide higher bandwidth for memory accesses. Some embodiments can provide a composable platform architecture which can allow for the scaling of the number of MAs for each server to meet the platform memory capacity and bandwidth requirements.

Embodiments can provide uniform latency and bandwidth for each SoC to all of the memory by having MAs that are coupled to portions of the memory, external to the SoCs and by coupling each of the MAs directly to the SoCs using a respective SerDes link. Such an architecture can allow an application or a virtual machine (VM) to rely on always having uniform latency to a physical address X in the memory regardless of the SoC (i.e., the processor in the respective SoC) the application or the VM may be executing on. Thus, some embodiments can allow in-place VM migration across processors in SoCs located at different sockets without the need to copy the memory content.

Embodiments can further provide a scalable and flexible architecture that can allow an increase in memory capacity without the need for additional pins on the SoC to accommodate the additional memory channels to support the higher memory capacity since the memory controllers are located in the external MAs. Thus, some embodiments can minimize the SoC pin count as well as reduce the number of traces that need to be routed from each SoC leading to a simplified PCB design. Spreading out the MAs that include the memory controllers and other associated circuitry, and the memory itself across the PCB may also result in improved power distribution across the PCB.

Certain embodiments can also eliminate the memory unavailability problem faced by conventional multi-socket servers due to an SoC failure or an SoC being in low power mode since the memory controller associated with any particular physical memory is not directly affected by the unavailability of any particular SoC as is the case in conventional systems.

Certain embodiments, as disclosed herein, may also enable out-of-sync development and testing of the SoC and the MAs using either the same process technologies or different process technologies. For example, the same version of the SoC may be manufactured and paired with different MAs to support different memory latencies, bandwidths and configurations.

FIG. 1 illustrates an example architecture for a conventional multi-socket server computer 100. In one implementation, the server computer 100 may include a first system on chip (SoC) 102, a second SoC 104, a third SoC 106 and a fourth SoC 108. Each SoC may be coupled to a respective local memory. For example, the first SoC 102 may be coupled to a memory 110, the second SoC 104 may be coupled to a memory 112, the third SoC 106 may be coupled to a memory 114 and the fourth SoC 108 may be coupled to a memory 116.

In some implementations, the first SoC 102, second SoC 104, third SoC 106 and the fourth SoC 108 may be mounted in respective sockets on a printed circuit board (PCB). Each of the memory 110, memory 112, memory 114 and the memory 116 may include volatile memory, e.g., dynamic random access memory (DRAM), synchronous dynamic random access memory (SDRAM), double data rate (DDR) SDRAM, etc. In some implementations, each of the memory 110, memory 112, memory 114 and the memory 116 may include one or more memory chips that may be part of a dual in-line memory module (DIMM) mounted on the same PCB as the SoCs.

A typical SoC may include functionalities of a system integrated into a single chip. For example, each of the first SoC 102, second SoC 104, third SoC 106, and the fourth SoC 108 may include one or more processors or processing cores, volatile or non-volatile memory modules, one or more internal buses, standard interfaces, peripherals, voltage regulators, power management circuits, timing resources such as oscillators and phase locked loop, etc. The first SoC 102 and the second SoC 104 may communicate using an inter-socket interconnect 118. The first SoC 102 and the third SoC 106 may communicate using an inter-socket interconnect 120. Similarly, the fourth SoC 108 and the second SoC 104 may communicate using an inter-socket interconnect 124. The fourth SoC 108 and the third SoC 106 may communicate using an inter-socket interconnect 122. For example, the inter-socket interconnects 118, 120, 122 and 124 may include HyperTransport by AMD® or QuickPath Interconnect (QPI) by Intel®. The use of inter-socket interconnect between the SoCs may allow maintaining a unified coherent address space between the SoCs through a coherency protocol.

Typically, each of the first SoC 102, second SoC 104, third SoC 106, and the fourth SoC 108 may include respective memory controller(s) to communicate with the memory 110, memory 112, memory 114, and the memory 116. Each of the first SoC 102, second SoC 104, third SoC 106, and the fourth SoC 108 can have global addressability to the memory 110, memory 112, memory 114, and the memory 116 using their respective memory controllers through the inter-socket interconnect. In most instances, the multi-socket server computer 100 may support non-uniform memory access (NUMA) architecture since the latency for the memory accesses by an SoC may depend on whether an access is to the local memory of that SoC or to the memory coupled to the other SoCs that are one hop or two hops away. Typically, the latencies to access the memory 110, memory 112, memory 114, and the memory 116 may be non-uniform for each of the first SOC 102, second SoC 104, third SoC 106, or the fourth SoC 108. For example, for the first SoC 102, the memory 110 is local (i.e., no hop), since the memory 110 may be coupled to a memory controller on the first SoC 102 using a memory bus, e.g., DDR interface. However, the memory 112 and the memory 114 are one hop away since the memory 112 is accessible via the inter-socket 118 and the memory 114 is accessible via the inter-socket 120. Similarly, for the first SoC 102, the memory 116 is two hops away since the memory 116 is accessible via the inter-sockets 118 and 124, or via the inter-sockets 120 and 122. It will be understood that the latencies for the write accesses may be different than the latencies for the read accesses. Similarly, for the second SoC 104, access to the local memory 112 may be faster than the access to the memory 110 or the memory 116 that are one hop away, or the access to the memory 114 that is two hops away. Thus, the multi-socket server computer 100 may provide non-uniform latency for memory accesses by each of the SoCs 102, 104, 106, or 108 depending on whether the memory is local to a given SoC or is one or more hops away.

Generally, since an application's performance may vary dramatically by memory latency, performance sensitive applications and operating system (OS) kernels may have to become NUMA aware due to the non-uniform latency supported by the multi-socket server computer 100 architecture. In some instances, the applications or the OS kernels may perform page migration to local memories to improve performance. However, this may introduce complexity in the applications and/or the OS kernels.

The multi-socket server computer 100 may face another limitation due to the unavailability of a memory coupled to a socket which has either failed or has transitioned to low power state for power optimization. For example, if the third SoC 106 fails or goes to low power mode, access to the memory 114 may be lost by either of the SoCs 102, 104, or 108.

Further, as the demand for higher memory capacity increases, it may be challenging for the multi-socket server computer 100 to include additional memory channels to support the higher memory capacity. For example, as the number of memory channels increase to support a higher number of memory modules, the number of integrated memory controllers may need to be increased in the SoCs 102, 104, 106, or 108 to accommodate the additional load. Since, in some instances, each memory channel may consume a couple hundred pins, the multi-socket server computer 100 architecture may be limited by the number of pins that can be used for the additional memory channels. In addition, physical routing of the signals on the PCB may get complex for a higher number of memory channels. Thus, the multi-socket server computer 100 may not support a scalable architecture that can keep up with the demand for higher memory capacity.

In some multi-socket server computers, external memory buffers can be coupled to each SoC in order to balance the load to the memory modules. However, the memory controllers on the SoC may still need to communicate with the memory buffers. Additionally, an SoC may still be limited by the number of memory controllers it can support due to the higher pin requirement of each memory controller. Thus, this type of multi-socket server computers may not provide a scalable architecture to keep up with the demand for higher memory capacity.

Various embodiments of the disclosed technologies can solve the problems faced by the multi-socket server 100 based on non-uniform memory access (NUMA) architecture, as will be discussed with reference to FIG. 2, FIG. 3, and FIG. 4.

Figure 2A:
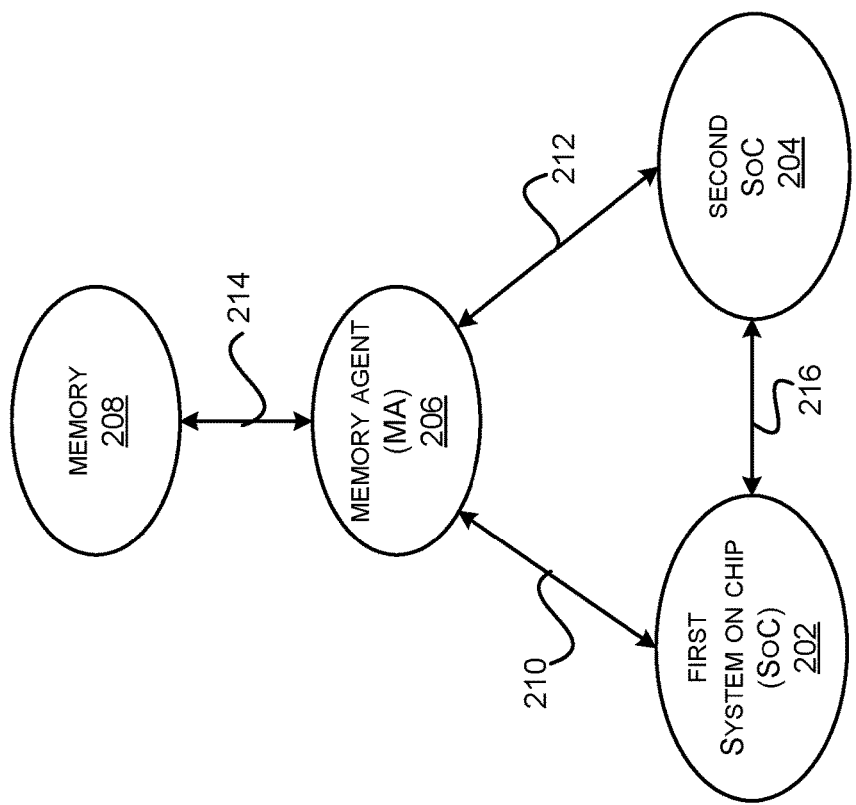
FIG. 2A illustrates an apparatus for a multi-socket server computer comprising two system on chips (SoCs), in one embodiment of the disclosed technologies.

FIG. 2A illustrates an apparatus 200 for a multi-socket server computer comprising two SoCs, in one embodiment of the disclosed technologies.

The apparatus 200 may include a first system on chip (SoC) 202, a second SoC 204, a memory agent (MA) 206 and a memory 208. In some embodiments, each of the first SoC 202 and the second SoC 204 can communicate with the MA 206 using a respective point-to-point interconnect. The point-to-point interconnect may include a serial link between two points, e.g., a port of an SoC and a port of an MA. In some embodiments, the point-to-point interconnect may implement Low Voltage Differential Signaling (LVDS) over differential pairs. For example, one pair (e.g., two wires) may be used for transmit and another pair may be used for receive. Therefore, a full duplex connection may include four wires. Data transmitted or received over the serial link may include encoded data, e.g., using 8b/10b encoding, and an encoded clock. In some embodiments, the point-to-point interconnect may include a high speed serial link such as a serializer/de-serializer (SerDes) link. The MA 206 can be coupled to the memory 208 via one or more memory channels 214. In certain embodiments, the memory controller used to communicate with the memory 208 can reside in the MA 206, which can help minimize the pin count on the first SoC 202 and the second SoC 204. The MA 206 can be implemented as an integrated circuit, a field programmable gate array (FPGA), or any suitable circuit. A first communication link 210 can be used between the MA 206 and the first SOC 202, and a second communication link 212 can be used between the MA 206 and the second SoC 204. In some embodiments, each of the first SoC 202, second SoC 204, and the MA 206 may include respective point-to-point interconnect interfaces (e.g., SerDes interfaces) to communicate over the first communication link 210 and the second communication link 212. The first SoC 202 and the second SoC 204 can communicate with each other using an inter-socket interconnect 216, e.g., HyperTransport by AMD® or QuickPath Interconnect (QPI) by Intel®.

Each of the first SoC 202 and the second SOC 204 may include multiple processors or processing cores. Each processor may be configured to execute instructions stored in a non-transitory computer readable medium. Each of the first SoC 202 and the second SOC 204 may further include a respective SoC point-to-point interconnect interface (e.g., SoC SerDes interface) to communicate with a corresponding MA point-to-point interconnect interface (e.g., MA SerDes interface) of the MA 206. The use of a point-to-point interconnect interface such as the SerDes interface between each SoC and each MA can help minimize the pin count and can provide higher bandwidth for memory accesses by the SoC. In some implementations, the first SoC 202 may include a first SoC SerDes interface and the second SOC 204 may include a second SoC SerDes interface. For example, each of the first SoC SerDes interface and the second SoC SerDes interface may include a parallel-in-serial-out (PISO) module to serialize the data for sending to the MA 206 over the respective communication link, and a serial-in-parallel-out (SIPO) module to de-serialize the incoming serial data received over the respective communication link from the MA 206. Any known or new SerDes protocol can be used, e.g., parallel clock SerDes, embedded clock bits SerDes, 8b/10b SerDes, or bit interleaving SerDes in embodiments disclosed without deviating from the scope of the disclosure. In various embodiments, respective SerDes interfaces can be configured for different clock frequencies, different number of lanes for each communication link, different number of bits per lane, etc. In addition, bandwidth for reading from the memory can be different than the bandwidth for writing to the memory. For example, in some instances, number of read accesses from the memory may be different than the number of write accesses to the memory. In some embodiments, number of lanes for each SerDes link can be reconfigured based on a read/write access pattern between the respective SoCs and the MAs. For each SoC, different number of lanes can be assigned for read accesses and write accesses. For example, one lane may represent one physical wire or trace on the PCB for each of the first communication link 210 or the second communication link 212.

In some embodiments, the memory agent (MA) 206 may include one or more memory controllers to communicate with the memory 208. In some implementations, the MA 206 may include a first memory controller to manage a first bank or portion of the memory 208 for the first SoC 202, and a second memory controller to manage a second bank or portion of the memory 208 for the second SoC 204. The MA 206 may also include one or more MA SerDes interfaces to communicate with a corresponding SoC SerDes interface of the one or more SoCs. For example, the MA 206 may include a first MA SerDes interface to communicate with the first SoC SerDes interface of the first SoC 202 via the first communication link 210, and a second MA SerDes interface to communicate with the second SoC SerDes interface of the second SoC 204 via the second communication link 212. In some embodiments, the MA 206 may be memory mapped to a portion of a respective physical address range for a processor of each SoC. In different implementations, the MA 206 may include firmware or programmable logic that can be updated to support different types of memories or protocols. In some implementations, the MA 206 may include an interconnect fabric to route the data associated with the memory accesses for each SoC to the appropriate memory channel coupled to the memory 208. The interconnect fabric may include AXI® (Advanced eXtensible Interface) interconnect fabric or any other suitable fabric without deviating from the scope of the disclosure.

Embodiments can support different classes or types of memory. For example, the memory 208 may include volatile memory, non-volatile memory or persistent memory. In one embodiment, the memory 208 may include dynamic random access memory (DRAM), synchronous dynamic random access memory (SDRAM), double data rate (DDR) SDRAM, static random access memory (SRAM), etc. In another embodiment, the memory 208 may include persistent memory, e.g., storage class memory (SCM). The persistent memory can retain its contents in the absence of power. Storage class memory can provide benefits of high performance memories such as a DRAM and cost effectiveness of hard disc drives. In some implementations, the storage class memory can include a negative-and (NAND) flash and can be accessed using a memory bus. In some implementations, the persistent memory can also be called non-volatile dual in-line memory module (NVDIMM) and can fit in a standard server DIMM slot. Note that other memory types are also possible, e.g., hybrid memory cubes (HMC) or high bandwidth memory (HBM).

In some implementations, a memory fabric may represent various components and interfaces between the memory 208 and the SoCs, e.g., the first SoC 202 and the second SoC 204. For example, the memory fabric may include the SerDes interfaces between the SoCs and the MA 206, and the memory channels between the MA 206 and the memory 208. In some embodiments, a memory fabric between the memory 208 and the SoCs via the MA 206 may be optimized for different types of the memory 208 to meet the bandwidth requirement, protocols supported by a given type of the memory 208, or requirements of the memory subsystem. For example, in some implementations, the memory 208 may be implemented using DIMMs comprising multiple DDR DRAM modules. Accordingly, the memory fabric may be optimized to support a certain number of SerDes lanes between each SoC and the MA 206, and a certain number of DDR channels for a given number of DDR DRAM modules in the memory 208 based on the associated bandwidth requirement. In another embodiment, the memory 208 may include storage class memory (SCM). For example, in some instances, SCM may be implemented using NAND flash memories. Accordingly, the memory fabric may be optimized based on whether addressing of the SCM is to be performed at a byte level or a block level, or any associated memory specific requirements.

In some instances, when a processor of the first SoC 202 has to perform a write or read access to the memory 208, the processor may provide an address corresponding to a portion of a memory address range which may be mapped to the MA 206. Based on the address, the memory access request may be directed to the first SoC SerDes interface of the first SoC 202 for sending to the MA 206 across the first communication link 210. For example, the memory access request may include read/write controls, write data, and an address for writing or reading the data from the memory 208. A PISO module in the first SoC SerDes interface may serialize the data from a parallel interface and send it over the first communication link 210 to the MA 206. A SIPO module in the first MA SerDes interface of the MA 206 may receive serial data for the memory access request and de-serialize the data to a parallel interface. A first memory controller in the MA 206 may determine if the memory access request includes a write access to the memory 208 or a read access from the memory 208. The first memory controller can send the write access request with the write data and the address to the memory 208 via the memory channel 214. For the read access request, the first memory controller may send the read address to the memory 208 and may receive the data back from the memory 208 via the memory channel 214. The MA 206 may send the read data back to the first SoC 202 via the first communication link 210. For example, the data read from the memory 208 may be serialized by a PISO module of the first MA SerDes interface before sending over the first communication link 210. The first SoC SerDes interface of the first SoC 202 may de-serialize the data received from the MA 206 into a parallel interface using a SIPO module.

Similarly, the second SoC 204 may perform a write or read access to the memory 208 by providing an address that may be mapped to a portion of a memory address range which may also be mapped to the MA 206. Note that the memory mapped address of the MA 206 for the second SoC 204 can be different than or the same as the memory mapped address of the MA 206 for the first SoC 202. Based on the address, the memory access request may be directed to the second SoC SerDes interface for sending to the MA 206 across the second communication link 212. For example, the memory access request may include read/write controls, write data, and an address for writing the data to or reading the data from the memory 208. A PISO module in the second SoC SerDes interface may serialize the data from a parallel interface and send it over the second communication link 212 to the MA 206. A SIPO module in the second MA SerDes interface of the MA 206 may receive serial data for the memory access request and de-serialize the data to a parallel interface. The second memory controller in the MA 206 may determine if the memory access request includes a write access to the memory 208 or a read access from the memory 208. A second memory controller can send the write access request with the write data and the address to the memory 208 via the memory channel 214. For the read access request, the second memory controller may send the read address to the memory 208 and may receive the data back from the memory 208 via the memory channel 214. The second memory controller may send the read data back to the second SoC 204 via the second communication link 212. For example, the data read from the memory 208 may be serialized by a PISO module of the second MA SerDes interface before sending over the second communication link 212. The second SoC SerDes interface of the second SoC 204 may de-serialize the data received from the MA 206 into a parallel interface using a SIPO module.

Thus, in some embodiments, the first SoC 202 and the second SoC 204 can access the memory 208 in uniform number of hops. For example, the uniform number of hops may include same number of hops for each SoC., e.g., one hop over the first communication link 210 for the first SoC 202, and one hop over the second communication link 212 for the second SoC 204. In some instances, uniform accesses to the memory 208 via the MA 206 by any of the SoCs can provide uniform latency for accesses to the memory 208. The uniform latency may indicate that a difference in latencies for memory accesses by the first SoC 202 and by the second SoC 204 may be smaller than a threshold. In some embodiments, the threshold may be a small fraction (e.g., less than one percent) of the processor clock cycle. For example, the uniform latency may indicate that the difference in latencies for memory accesses by the first SoC 202 and by the second SoC 204 is close to zero or negligible. It will be understood that the difference in latencies for memory accesses by the first SoC 202 and by the second SoC 204 may depend upon a number of factors such as transaction queues in the MA 206, configuration of the communication links 210 and 212, etc. Additionally, if one of the SoCs fails or goes to low power mode, the memory 208 may still be accessible to the other SoC. For example, if the first SoC 202 is unavailable, the second SoC 204 can still access the memory 208 via the MA 206, and vice-versa.

Figure 2B:
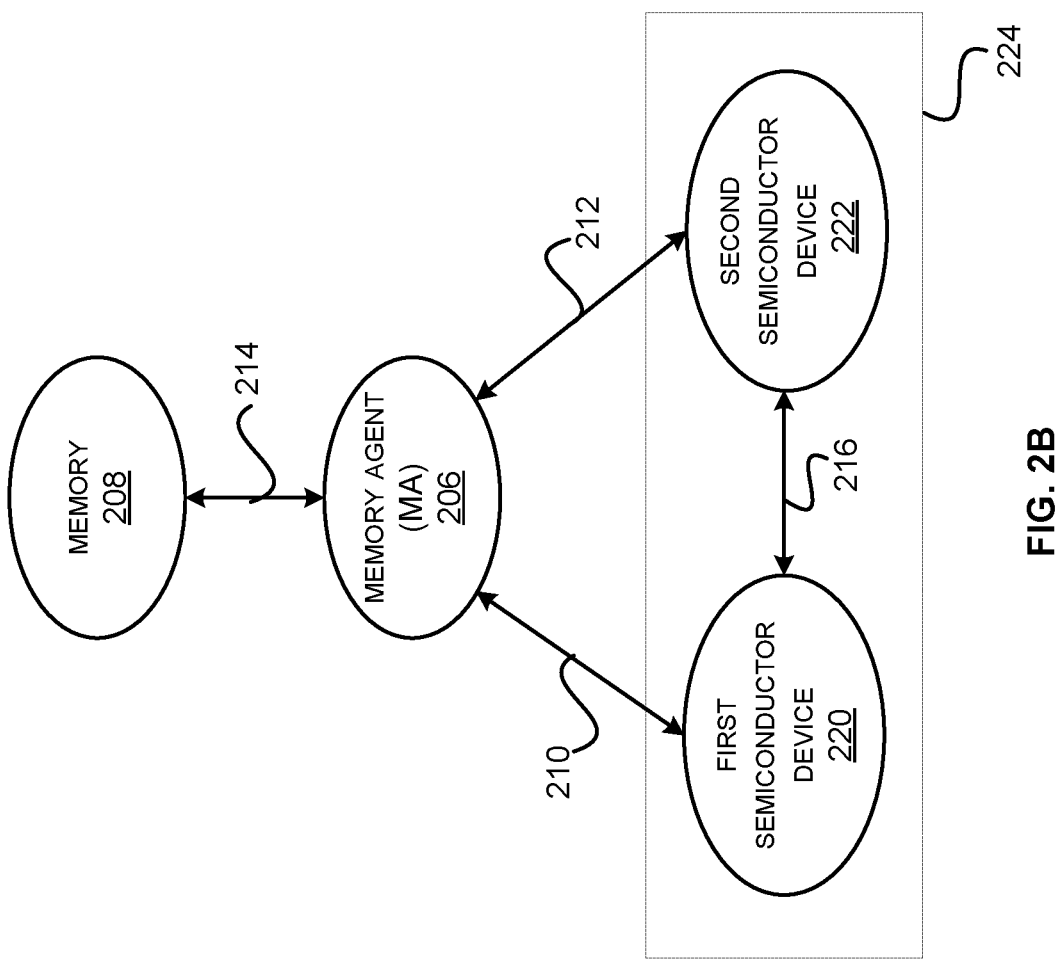
FIG. 2B illustrates an apparatus for a multi-socket server computer comprising two semiconductor devices in one package, in one embodiment of the disclosed technologies.

FIG. 2B illustrates an apparatus 218 for a multi-socket server computer comprising two semiconductor devices, in one embodiment of the disclosed technologies.

In some embodiments, the apparatus 218 may include a first semiconductor device 220, and a second semiconductor device 222 coupled to the MA 206. The first semiconductor device 220 may have same logic or functionality as the first SoC 202 and the second semiconductor device 222 may have same logic or functionality as the second SoC 204, as discussed with reference to FIG. 2A. For example, the first SoC 202 can be on a first semiconductor die, and the second SoC 204 can be on a second semiconductor die, and both the first and second semiconductor dies can be part of the same package, e.g., a package 224. In some embodiments, the first semiconductor device 220 may include a first CPU and the second semiconductor device 222 may include a second CPU, and the first CPU may be mounted on a first socket and the second CPU may be mounted on a second socket.

In some embodiments, the first semiconductor device 220 may include a first device point-to-point interconnect interface to communicate with the MA first point-to-point interconnect interface of the MA 206 over the communication link 210. Similarly, the second semiconductor device 222 may include a second device point-to-point interconnect interface to communicate with the MA second point-to-point interconnect interface of the MA 206 over the communication link 212. For example, each point-to-point interconnect interface may include a respective SerDes interface as discussed with reference to FIG. 2A. The first device point-to-point interconnect interface and the second device point-to-point interconnect interface may be similar to the first SoC point-to-point interconnect interface and the second SoC point-to-point interconnect interface respectively.

Embodiments can provide a scalable architecture which can be expanded to support higher memory capacity. For example, in some instances, the memory 208 can be expanded to include additional memory modules for higher memory capacity. Some embodiments can allow updating the MA 206 to support the additional memory modules by updating the memory controllers on the MA 206. Thus, higher memory capacity can be supported without affecting the pin count on the first SoC 202 or the second SoC 204 since the memory controllers are external to the SoCs. In addition, the embodiments can support different types of memories by updating the MA 206. This is further explained with reference to FIG. 3.

FIG. 3 illustrates an apparatus 300 for a multi-socket server computer configured to support two types of memories, in one embodiment of the disclosed technologies.

The apparatus 300 may include a type 1 memory agent (MA) 306 coupled to a first SoC 302 and to a second SoC 304, and a type 2 memory agent 310 coupled to the first SoC 302 and to the second SoC 304. The type 1 memory agent 306 may be coupled to a type 1 memory 308, and the type 2 memory agent 310 may be coupled to a type 2 memory 312. The first SoC 302 and the second SoC 304 can communicate with each other using an inter-socket interconnect 326, e.g., HyperTransport by AMD® or QuickPath Interconnect (QPI) by Intel®.

In one implementation, the type 1 memory 308 may include a volatile memory and the type 2 memory 312 may include a persistent memory, or vice-versa. For example, some non-limiting examples of a volatile memory may include SDRAM, DDR SDRAM, DRAM, SRAM, etc., and some non-limiting examples of a persistent memory may include storage class memory, non-volatile memory etc. Note that other combinations of memory types are possible, e.g., different types of volatile memories, non-volatile memories, or persistent memories can be supported. For example, in some embodiments, the type 1 memory 308 or the type 2 memory 312 may include hybrid memory cubes (HMC) or high bandwidth memory (HBM).

The first SoC 302 may be similar to the first SoC 202, the second SoC 304 may be similar to the second SoC 204, and the type 1 MA 306 may be similar to the MA 206, as discussed with reference to FIG. 2. For example, the first SoC 302 may include a first SoC SerDes interface to communicate with the type 1 memory agent 306 via a first communication link 314, and the second SoC 304 may include a second SoC SerDes interface to communicate with the type 1 memory agent 306 via a second communication link 316. The first communication link 314 and the second communication link 316 may be similar to the first communication link 210 and the second communication link 212 respectively, as discussed with reference to FIG. 2. Similarly, the first SoC 302 may include a third SoC SerDes interface to communicate with the type 2 memory agent 310 via a third communication link 318, and the second SoC 304 may include a fourth SoC SerDes interface to communicate with the type 2 memory agent 310 via a fourth communication link 320. The third communication link 318 and the fourth communication link 320 may be similar to the first communication link 210 and the second communication link 212 respectively, as discussed with reference to FIG. 2. In various embodiments, each of the communication links 314, 316, 318, and 320 may be configured to support a different number of lanes, a different number of bits per lane, different clock frequencies, etc.

The type 1 MA 306 may include one or more memory controllers to communicate with the type 1 memory 308 via one or more memory channels 322. The one or more memory controllers in the type 1 MA 306 may be configured to manage a portion of the type 1 memory 308 for the first SoC 302 or the second SoC 304. The type 1 MA 306 may also include a first MA SerDes interface to communicate with the first SoC SerDes interface of the first SoC 302 via the first communication link 314, and a second MA SerDes interface to communicate with the second SoC SerDes interface of the second SoC 304 via the second communication link 316.

The type 2 MA 310 may include one or more memory controllers to communicate with the type 2 memory 312 via one or more memory channels 324. The one or more memory controllers in the type 2 MA 310 may be configured to manage a portion of the type 2 memory 312 for the first SoC 302 or the second SoC 304. The type 2 MA 310 may also include a first type 2 MA SerDes interface to communicate with the third SoC SerDes interface of the first SoC 302 via the third communication link 318, and a second type 2 MA SerDes interface to communicate with the fourth SoC SerDes interface of the second SoC 304 via the fourth communication link 320.

Some embodiments can provide a first uniform memory latency for the type 1 memory 308 via the type 1 MA 306, and a second uniform memory latency for the type 2 memory 312 via the type 2 MA 310. For example, the first uniform latency to access the type 1 memory 308 may indicate that a difference in latencies for access to the type 1 memory 308 by the first SoC 302 and by the second SoC 304 may be smaller than a first threshold. Similarly, the second uniform latency to access the type 2 memory 312 may indicate that a difference in latencies for access to the type 2 memory 312 by the first SoC 302 and by the second SoC 304 may be smaller than a second threshold. The first threshold and the second threshold may be different or the same based on the type of the memories.

In some implementations, a first memory fabric may represent various components and interfaces between the type 1 memory 308, and the first SoC 302 and the second SoC 304, and a second memory fabric may represent various components and interfaces between the type 2 memory 312, and the first SoC 302 and the second SoC 304. In some embodiments, each of the first memory fabric and the second memory fabric may be optimized differently for different types of memories without affecting the other memory fabric. For example, the first memory fabric may be optimized to meet the bandwidth requirement of the type 1 memory 308, protocols supported by the type 1 memory 308, or requirements of the memory subsystem of the type 1 memory 308. The second memory fabric may be optimized to meet the bandwidth requirement of the type 2 memory 312, protocols supported by the type 2 memory 312, or requirements of the memory subsystem of the type 2 memory 312. In addition, the SerDes interfaces in the first memory fabric may be operated at different clock frequencies and with a different number of lanes than the SerDes interfaces in the second memory fabric.

Note that even though FIG. 3 illustrates two types of memories, wherein each type of memory is accessible by each of the SoCs in uniform number of hops, it will be understood that the embodiments can support more than two types of memories without deviating from the scope of this disclosure. For example, three or four different types of memories can be supported, and each type of memory can be accessible by each of the SoCs in uniform number of hops via their respective MAs over the respective communication links. Certain embodiments of the disclosed technologies can allow scaling of the memory agents for each memory type to meet the server platform capacity and the bandwidth requirements, as discussed with reference to FIG. 4.

Figure 4:
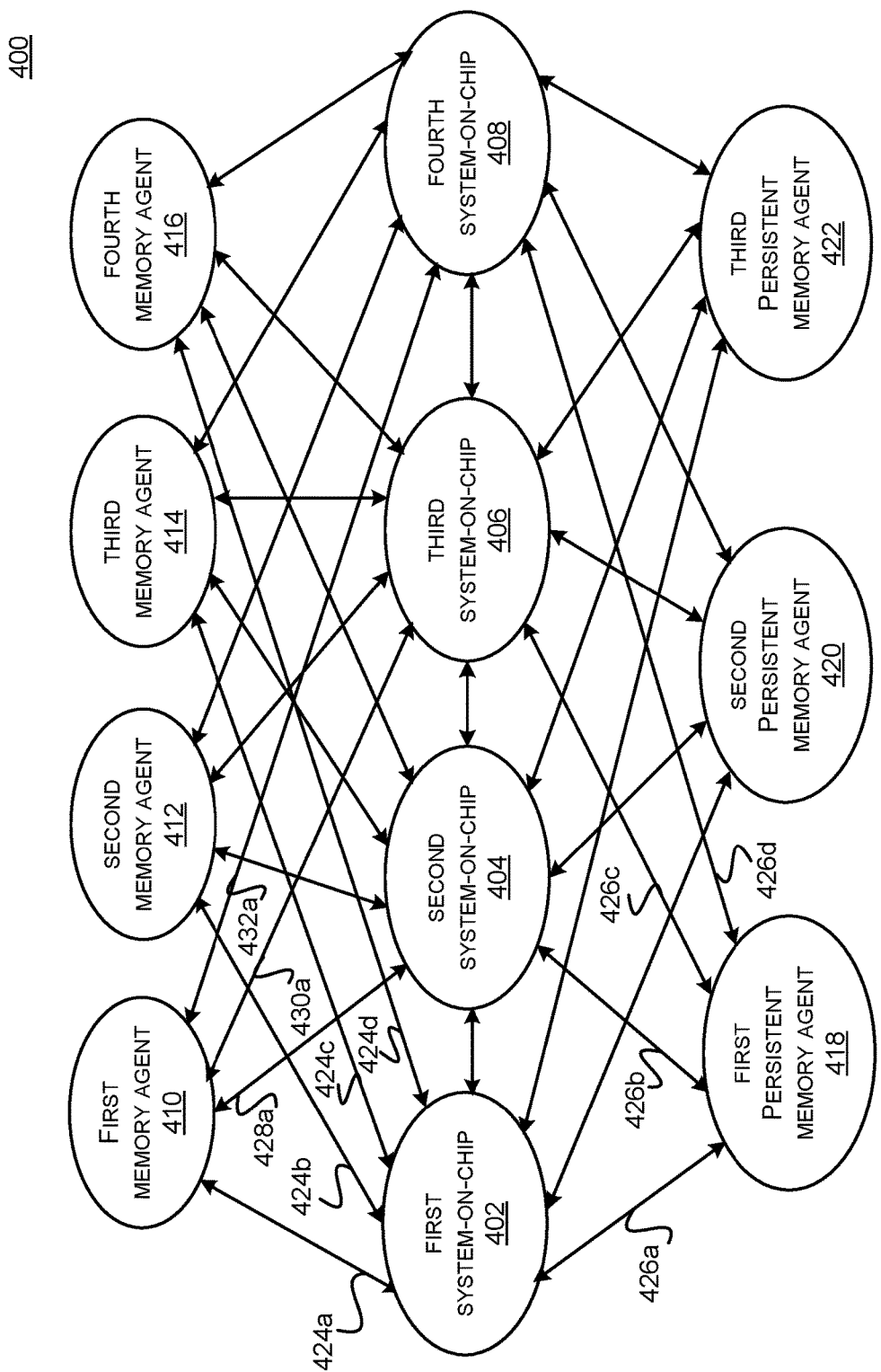
FIG. 4 illustrates an apparatus for a multi-socket server computer comprising a plurality of system on chips coupled to a plurality of memory agents, in one embodiment of the disclosed technologies.

FIG. 4 illustrates an apparatus 400 for a multi-socket server computer comprising a plurality of SoCs coupled to a plurality of memory agents, in one embodiment of the disclosed technologies.

The apparatus 400 may include a plurality of SoCs, e.g., a first SoC 402, a second SoC 404, a third SoC 406, and a fourth SoC 408. Each of the first SoC 402, second SoC 404, third SoC 406, and the fourth SoC 408 may be coupled to a first MA 410, a second MA 412, a third MA 414, and a fourth MA 416 via respective communication links using respective SerDes interfaces. For example, a first SoC SerDes interface of the first SoC 402 may be coupled to a first MA SerDes interface of the first MA 410 via a communication link 424a, a second SoC SerDes interface of the first SoC 402 may be coupled to a first MA SerDes interface of the second MA 412 via a communication link 424b, a third SoC SerDes interface of the first SoC 402 may be coupled to a first MA SerDes interface of the third MA 414 via a communication link 424c, and a fourth SoC SerDes interface of the first SoC 402 may be coupled to a first MA SerDes interface of the fourth MA 416 via a communication link 424d. Each of the first MA 410, second MA 412, third MA 414, and the fourth MA 416 may be coupled to a respective type 1 memory (not shown). For example, the respective type 1 memory coupled to each of the MAs may be similar to the type 1 memory 308, as discussed with reference to FIG. 3.

Each of the first SoC 402, second SoC 404, third SoC 406, and the fourth SoC 408 may also be coupled to a first PMA 418, a second PMA 420 and a third PMA 422 via respective communication links using respective SerDes interfaces. For example, the first SoC 402 can communicate with the first PMA 418 via the communication link 426a, the second SoC 404 can communicate with the first PMA 418 via a communication link 426b, the third SoC 406 can communicate with the first PMA 418 via a communication link 426c, and the fourth SoC 408 can communicate with the first PMA 418 via a communication link 426d. Each of the first PMA 418, second PMA 420, and the third PMA 422 may be coupled to a respective type 2 memory (not shown). For example, the respective type 2 memory coupled to each of the PMAs may be similar to the type 2 memory 312, as discussed with reference to FIG. 3.

In some embodiments, each MA (e.g., the first MA 410, second MA 412, third MA 414, and the fourth MA 416) and each PMA (e.g. the first PMA 418, second PMA 420 and the third PMA 422) may be mapped to a certain respective portion of a memory address range for a processor of each of the first SoC 402, second SoC 404, third SoC 406, or the fourth SoC 408, based on a mapping function. In some embodiments, a cache line interleaving across the first MA 410, second MA 412, third MA 414, and the fourth MA 416 may be performed using the mapping function. For example, the mapping function may utilize a round robin algorithm, perform a hash of some of the address bits to determine mapping of the MAs to the respective memory address ranges, or utilize any other suitable technique without deviating from the scope of the disclosure. Referring back to FIG. 4, the first SoC 402 can communicate with the first MA 410 via the communication link 424a, the second SoC 404 can communicate with the first MA 410 via a communication link 428a, the third SoC 406 can communicate with the first MA 410 via a communication link 430a, and the fourth SoC 408 can communicate with the first MA 410 via a communication link 432a.

In some instances, each of the MAs and each of the PMAs may include respective bandwidth regulators to provide fairness among multiple ports interfacing with respective SoCs or bias certain ports to have restricted or increased bandwidth respective to other ports. For example, the first MA 410 may include four ports to interface with the four SoCs. In some embodiments, an amount of bandwidth that each port can be allowed to consume from a total bandwidth supported by the first MA 410 can be configured. For example, each of the MAs and PMAs can include a respective memory mapped bandwidth regulator register that may be configured (e.g., by a hypervisor running on a host device for the SoCs) to control the link bandwidth between each MA or PMA, and each of the SoCs.

Certain embodiments of the disclosed technologies can overcome some of the problems faced by the conventional multi-socket server computers, as discussed with reference to FIG. 1. For example, each of the first SoC 402, second SoC 404, third SoC 406 or the fourth SoC 408 can access any of the memory, e.g., memories attached to the MAs 410, 412, 414, 416 or the memories attached to the PMAs 418, 420, 422, in uniform number of hops. For example, any of the memory attached to any MA or PMA can be accessed by any of the SoCs in a single hop via the MA or the PMA over the respective communication link. In addition, some embodiments can provide uniform latency and bandwidth for each of the first SoC 402, second SoC 404, third SoC 406 or the fourth SoC 408 for each type of memory, e.g., the memories attached to the MAs 410, 412, 414, 416 or the memories attached to the PMAs 418, 420, 422. For example, each of the first SoC 402, second SoC 404, third SoC 406, and the fourth SoC 408 can have uniform latency for memory accesses to a first type 1 memory coupled to the first MA 410, a second type 1 memory coupled to the second MA 412, a third type 1 memory coupled to the third MA 414, and a fourth type 1 memory coupled to the fourth MA 416 via respective SerDes interfaces. Similarly, each of the first SoC 402, second SoC 404, third SoC 406, and the fourth SoC 408 can have uniform latency for memory accesses to a first type 2 memory coupled to the first PMA 418, a second type 2 memory coupled to the second PMA 420, and a third type 2 memory coupled to the third PMA 422 via respective SerDes interfaces.

In addition, in instances where one of the SoCs becomes unavailable due to failure or the SoC entering low power mode, all the memories attached to all the MAs or PMAs can still be globally accessed by the remaining SoCs. Further, in some embodiments, uniform access to any of the memories by any of the processors can minimize migration of the VMs between the processors by performing a change in context instead of performing page migration between the memories.

Figure 5:
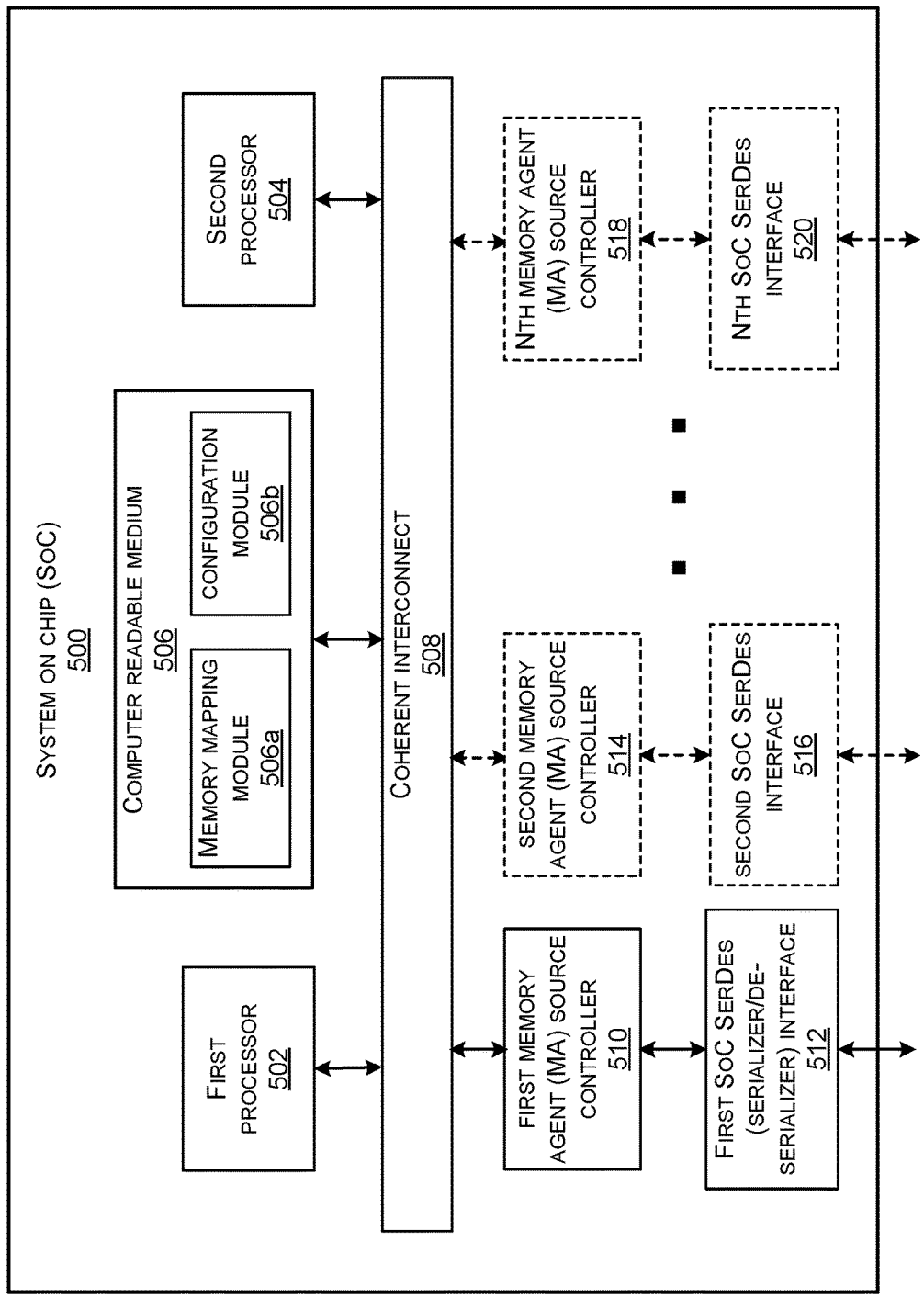
FIG. 5 illustrates a block diagram for a system on chip (SoC) for a multi-socket server computer, in one embodiment of the disclosed technologies.

FIG. 5 illustrates a block diagram for a system on chip (SoC) 500 for a multi-socket server computer, in one embodiment of the disclosed technologies. For example, the SoC 500 may be similar to any of the SoCs discussed previously with reference to different embodiments in FIGS. 2-4. The SoC 500 may be coupled to one or more MAs via respective SerDes interfaces.

The SoC 500 may include a first processor 502, a second processor 504, and a computer readable medium 506 coupled to a coherent interconnect 508. The coherent interconnect 508 may also be coupled to one or more MA source controllers to communicate with respective one or more MAs via respective one or more SoC SerDes interfaces. For example, the coherent interconnect 508 may be coupled to a first MA source controller 510, a second MA source controller 514, . . . , and an Nth MA source controller 518. The first MA source controller 510 may be coupled to a first SoC SerDes interface 512, the second MA source controller 514 may be coupled to a second SoC SerDes interface 516, . . . , the Nth MA source controller 518 may be coupled to an Nth SoC SerDes interface 520. It should be noted that the dotted lines in the SoC 500 block diagram may represent optional MA source controllers and SoC SerDes interfaces based on the number of MAs and/or PMAs communicatively coupled to the SoC 500. In some embodiments, "N" can be seven, as discussed with reference to FIG. 4. For example, each SoC in FIG. 4 can communicate with four MAs and three PMAs. In some implementations the one or more MAs coupled to the SoC 500 may include MAs which can be coupled to different types of memories. For example, in some embodiments, the SoC 500 may be coupled to the type 1 MA 306 for the type 1 memory 308 (e.g., volatile memory) and the type 2 MA 310 (e.g., PMA) for the type 2 memory 312 (e.g., persistent memory) as discussed with reference to FIG. 3.

Each of the first processor 502 and the second processor 504 may include one or more processing cores or processing logic to execute instructions stored in the computer readable medium 506, such as a processor cache (not shown). The computer readable medium 506 may be non-transitory and may be in the form of a cache, buffer, or memory and may be coupled to the processors and spread throughout the SoC in different configurations without deviating from the scope of the disclosure. In some implementations, the computer readable medium 506 may include a memory mapping module 506*a* and a configuration module 506*b*.

The coherent interconnect 508 may be configured to maintain coherency among different components of the SoC 500. For example, in some implementations, the coherent interconnect 508 may include a coherency controller and a coherency directory to maintain the coherency for the physical address space among different components of the SoC 500.

According to some embodiments, the SoC 500 may include a one-to-one link with each MA coupled to the SoC 500 using a respective MA source controller and a respective SoC SerDes interface. For example, in some embodiments, each of the MAs coupled to the SoC 500 may be mapped to a respective portion of a memory address range for the first processor 502 and for the second processor 504. Each of the first MA source controller 510, second MA source controller 514, . . . , and the Nth MA source controller 518 may be configured to receive a transaction request from the first processor 502 or the second processor 504 for a write or a read access of a memory. The transaction request may include an address, data, and controls for the write access or the read access of the memory. Based on the address for the read or write access on the coherent interconnect 508, the first MA source controller 510, second MA source controller 514, . . . , and the Nth MA source controller 518 may identify the MA to which the transaction request is directed. In certain embodiments, the respective MA source controller may claim the transaction and proceed with processing the transaction using the respective SerDes interface. For example, the first MA source controller 510 may identify that the transaction request is directed to a first MA coupled to the SoC 500, or the second MA source controller 514 may identify that the transaction request is directed to a second MA coupled to the SoC 500, or the Nth MA source controller 518 may identify that the transaction request is directed to an Nth MA coupled to the SoC 500. In other embodiments, the respective processor or other associated circuitry may direct the transaction to the respective MA source controller over the coherent interconnect 508 using the information in the memory mapping module 506*a*. Any transaction requests targeted to the first MA based on its memory mapped address may be forwarded to the first MA source controller 510. For example, the first MA source controller 510 may receive a transaction request initiated by the first processor 502 or the second processor 504 via the coherent interconnect 508 to access a memory coupled to the first MA. The first MA source controller 510 may forward the transaction request to the first SoC SerDes interface 512 to send the request via a communication link to the first MA.

The first SoC SerDes interface 512 may include a PISO module to serialize the data from a parallel interface to a serial output, and an SIPO module to de-serialize the serial data into a parallel interface. For example, the PISO module may be used to receive the data from a parallel interface for the transaction request received from the first MA source controller 510 and convert it to a serial output for sending it to the first MA over a communication link. For example, the serial output may be sent to the MA (e.g., the MA 206, type 1 MA 306, or the first MA 410) via a SerDes link (e.g., the first communication link 210, first communication link 314 or the first communication link 424*a* respectively), as discussed with reference to FIGS. 2-4. The first SoC SerDes interface 512 may also include a SIPO module to de-serialize the serial data received from the first MA over the SerDes link and convert the data from a serial interface to a parallel interface to be consumed by the first processor 502 or the second processor 504. For example, data converted to the parallel interface can be sent by the first MA source controller 510 to the first processor 502 or the second processor 504 via the coherent interconnect 508.

Similarly, the second MA source controller 514 may send a transaction request directed to the second MA coupled to the SoC 500 via the second SoC SerDes interface 516. For example, the transaction request may be received from the first processor 502 or the second processor 504 via the coherent interconnect 508, and may be for a write access or a read access of a memory coupled to the second MA. The second SoC SerDes interface 516 may also include a PISO module and an SIPO module to perform serialization/de-serialization of the data to and from the second MA.

Similarly, the Nth MA source controller 518 may send a transaction request directed to the Nth MA coupled to the SoC 500 via the Nth SoC SerDes interface 520. For example, the transaction request may be received from the first processor 502 or the second processor 504 via the coherent interconnect 508, and may be for a write access or a read access of a memory coupled to the Nth MA. The second Nth SoC SerDes interface 520 may also include a PISO module and an SIPO module to perform serialization/de-serialization of the data to and from the Nth MA.

The memory mapping module 506*a* may be configured to perform mapping of various memory agents to respective portions of address ranges. For example, the memory mapping module 506*a* may perform mapping of a first MA to a first portion of a memory address range for the first processor 502 and the second processor 504. Similarly, the memory mapping module 506*a* may perform mapping of a second MA to a second portion of the memory address range for the first processor 502 and the second processor 504, and so on. In some instances, when the memory capacity is increased by adding more memory modules, the memory mapping module 506a can also allow remapping of the MAs to support larger memory address range.

The configuration module 506b may be used for configuration of different components of the SoC 500. For example, the configuration module 506b may be used to configure different attributes of the SerDes interface between each SoC and the MA, e.g., a number of lanes, a number of bits per lane, clock frequency, etc. In some embodiments, the configuration module 506b may be used to configure different address ranges for each MA coupled to the SoC 500 based on the address space associated with the first processor 502 and the second processor 504.

Figure 6:
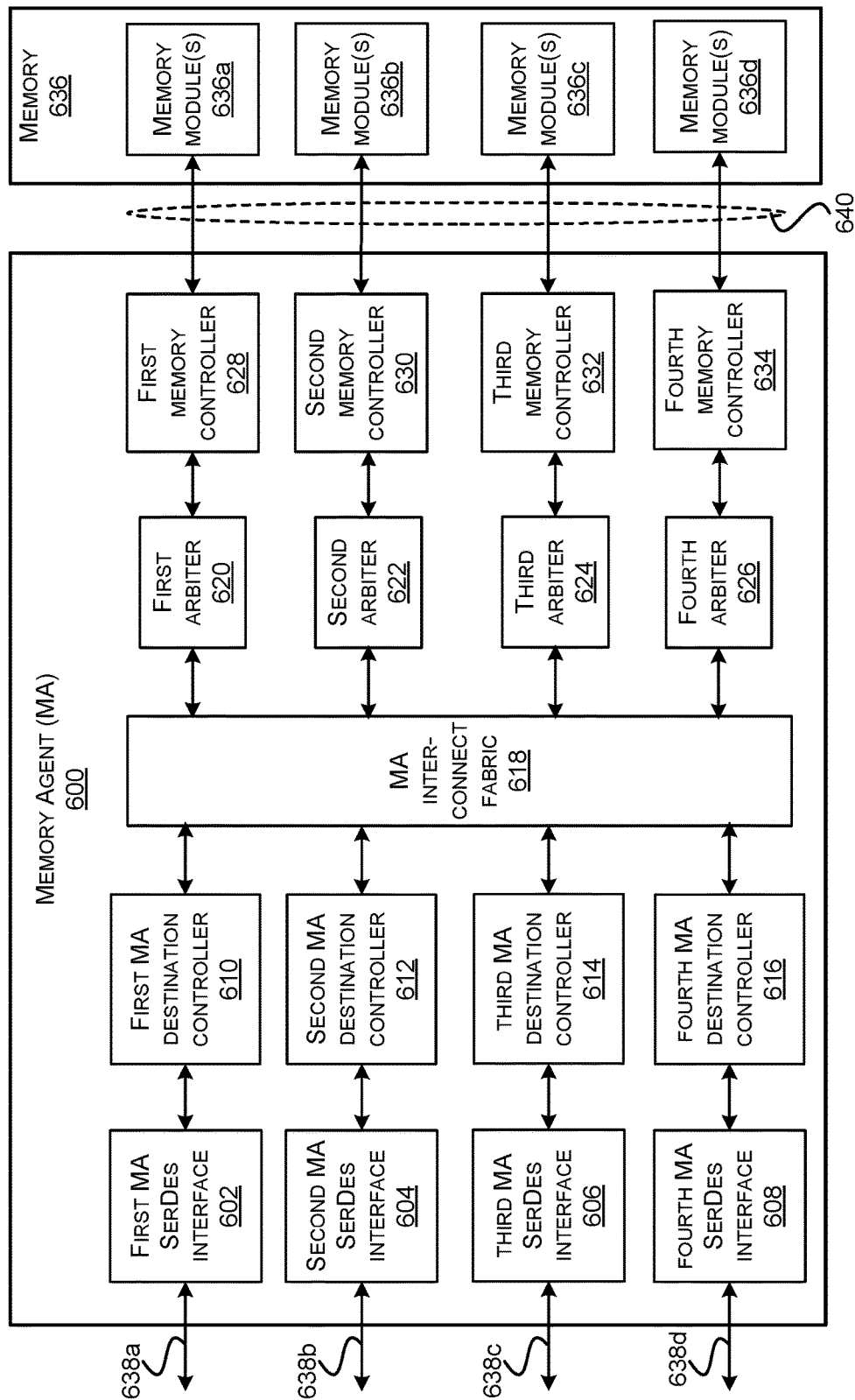
FIG. 6 illustrates an example block diagram for a memory agent (MA) coupled to a memory, in one embodiment of the disclosed technologies.

FIG. 6 illustrates an example block diagram for a memory agent (MA) 600 coupled to a memory 636, in one embodiment of the disclosed technologies. The memory agent 600 may be similar to the first MA 206, type 1 MA 306, first MA 410, second MA 412, third MA 414, or the fourth MA 416, as discussed with reference to FIGS. 2-4.

The memory agent 600 may include multiple MA SerDes interfaces, e.g., a first MA SerDes interface 602, a second MA SerDes interface 604, a third MA SerDes interface 606, and a fourth MA SerDes interface 608. The memory agent 600 may also include multiple MA destination controllers, e.g., a first MA destination controller 610, a second MA destination controller 612, a third MA destination controller 614, and a fourth MA destination controller 616. The memory agent 600 may also include a first arbiter 620, a second arbiter 622, a third arbiter 624, and a fourth arbiter 626. The memory agent 600 may further include a first memory controller 628, a second memory controller 630, a third memory controller 632, and a fourth memory controller 634. An MA interconnect fabric 618 may be configured to connect the first MA destination controller 610, second MA destination controller 612, third destination controller 614, and the fourth destination controller 616 to the first arbiter 620, second arbiter 622, third arbiter 624, and the fourth arbiter 626. It will be understood that the MA 600 can include more or fewer numbers of MA SerDes interfaces, MA destination controllers, arbiters, and memory controllers than shown in FIG. 6 based on the number of SoCs coupled to the MA 600, without deviating from the scope of the disclosure.

The memory agent 600 may be coupled to the memory 636 via memory channels 640. The memory 636 may be shared by all the SoCs coupled to the MA 600, e.g., using respective SerDes interfaces. In some implementations, the memory 636 may include multiple memory modules, e.g., one or more memory modules 636a, one or more memory modules 636b, one or more memory modules 636c, and one or more memory modules 636d. In one embodiment, the memory 636 may include volatile memory, e.g., DDR SDRAM, DDR2 SDRAM, DDR3 SDRAM, or DDR4 SDRAM. It will be understood that the memory 636 may be able to support different configurations, e.g., varying numbers of DDR slots, with or without error correction code (ECC), multi-channel configuration, etc. In some implementations, the memory 636 may include a DIMM package and each of the memory modules 636a, 636b, 636c, and 636d may correspond to a respective DDR slot in the DIMM.

Each of the first MA SerDes interface 602, second MA SerDes interface 604, third MA SerDes interface 606, and the fourth MA SerDes interface 608 may be configured to communicate with a corresponding SoC SerDes interface of a given SoC from a plurality of SoCs coupled to the MA 600 via a respective port over a respective communication link. For example, the first MA SerDes interface 602 may communicate with a first SoC SerDes interface of a first SoC via a first port over a communication link 638a, the second MA SerDes interface 604 may communicate with a first SoC SerDes interface of a second SoC via a second port over a communication link 638b, the third MA SerDes interface 606 may communicate with a first SoC SerDes interface of a third SoC via a third port over a communication link 638c, and the fourth MA SerDes interface 608 may communicate with a first SoC SerDes interface of a fourth SoC via a fourth port over a communication link 638d. In one embodiment, the first MA 410, second MA 412, third MA 414 and the fourth MA 416, as discussed with reference to FIG. 4, may be similar to the MA 600. In one implementation, referring back to FIG. 4, the communication link 638a can be the first communication link 424a for the first SoC 402, communication link 638b can be the first communication link 428a for the second SoC 404, communication link 638c can be the first communication link 430a for the third SoC 406, and the communication link 638d can be the first communication link 432a for the fourth SoC 408.

Each of the first MA SerDes interface 602, second MA SerDes interface 604, third MA SerDes interface 606, and the fourth MA SerDes interface 608 may include an SIPO module and a PISO module. For example, the SIPO module in the first MA SerDes interface 602 may receive serial data from the first SoC 402 over the communication link 638a for a first transaction with the memory 636, and de-serialize the serial data into a parallel interface to be used by the first MA destination controller 610. The serial data may include data, an address and controls for a write transaction to the memory 636, or an address and controls for a read transaction from the memory 636. The PISO module in the first MA SerDes interface 602 may receive data via the parallel interface from the first MA destination controller 610 in response to the first transaction and serialize the data to be sent to the first SoC 402 over the communication link 638a. The data from the parallel interface may include data read from the memory 636 for the read transaction or a write response for the write transaction. Similarly, the SIPO module and the PISO module in the second MA SerDes interface 604 may communicate with the second SoC 404 over the communication link 638b for a second transaction with the memory 636, the SIPO module and the PISO module in the third MA SerDes interface 606 may communicate with the third SoC 406 over the communication link 638c for a third transaction with the memory 636, and the SIPO module and the PISO module in the fourth MA SerDes interface 608 may communicate with the fourth SoC 408 over the communication link 638d for a fourth transaction with the memory 636.

In some embodiments, an amount of bandwidth that each port interfacing with an SoC can be allowed to consume from a total bandwidth supported by the MA 600 can be configured. For example, the MA 600 may include one or more bandwidth regulators to regulate bandwidth consumed by each port of the MA 600 configured to interface with the respective SoC via the respective communication link. In one implementation, each of the first MA SerDes interface 602, second MA SerDes interface 604, third MA SerDes interface 606, and the fourth MA SerDes interface 608 may include a respective memory mapped bandwidth regulator register (not shown) to control the bandwidth consumed by the respective port interfacing with the first SoC 402, second SoC 404, third SoC 406 and the fourth SoC 408 respectively. In another implementation, a central bandwidth regulator may be used to regulate the bandwidth for all the ports interfacing with the SoCs. Bandwidth regulation can provide fairness among multiple ports interfacing with the SoCs so that one SoC does not consume all the bandwidth supported by the MA 600.

Each of the first MA destination controller 610, second MA destination controller 612, third destination controller 614, and the fourth destination controller 616 may be configured to control the destination of the respective transaction. For example, since each of the first SoC 402, second SoC 404, third SoC 406, and the fourth SoC 408 can have global addressability to the memory 636, based on the address of the transaction request, each of the first MA destination controller 610, second MA destination controller 612, third destination controller 614, and the fourth destination controller 616 can direct the transaction request from any of the SoCs received via the respective SerDes interface to any of the arbiters 620, 622, 624, 626 via the MA interconnect fabric 618. The MA interconnect fabric 618 may provide an internal fabric to the MA 600 for routing the data received from the MA destination controllers to the appropriate arbiter. The MA interconnect fabric 618 may include AXI® (Advanced eXtensible Interface) interconnect fabric or any other suitable fabric without deviating from the scope of the disclosure.

Each of the first arbiter 620, second arbiter 622, third arbiter 624, and the fourth arbiter 626 may be configured to allow access to the memory 636 shared by all the SoCs, e.g., the SoC 402, SoC 404, SoC 406 and SoC 408, based on arbitration. The arbitration may be based on priority (fixed or programmable), a round robin algorithm, or any suitable policy. In some implementations, each arbiter 620, 622, 624, 626 may be integrated with its respective memory controller. For example, the first arbiter 620 may be integrated with the first memory controller 628, and so on.

Each of the first memory controller 628, second memory controller 630, third memory controller 632, and the fourth memory controller 634 may be configured to communicate with the memory 636 via respective memory channels to perform a memory write or read access for the transaction requested by the respective SoC based on the protocol for the specific memory type. For the write access, data provided by the source SoC can be written into the memory module at the address specified by the source SoC. For the read access, the data can be read by the respective memory controller and can be sent back to the source SoC via the respective MA SerDes interface. For example, the first memory controller 628 may receive the transaction request from the first arbiter 620 and may communicate accordingly with the one or more memory modules 636a using suitable chip select, address bus, data bus, read or write control signals, row address strobe (RAS), column address strobe (CAS), and any relevant signals. The transaction request may be received by the first arbiter 620 from the first MA destination controller 610, second MA destination controller 612, third MA destination controller 614, or the fourth MA destination controller 616 via the MA interconnect fabric 618. Thus, in some embodiments, when one of the SoCs is unavailable due to failure or low power mode, the memory 636 can still be accessible to the other SoCs via their respective SerDes links.

Figure 7:
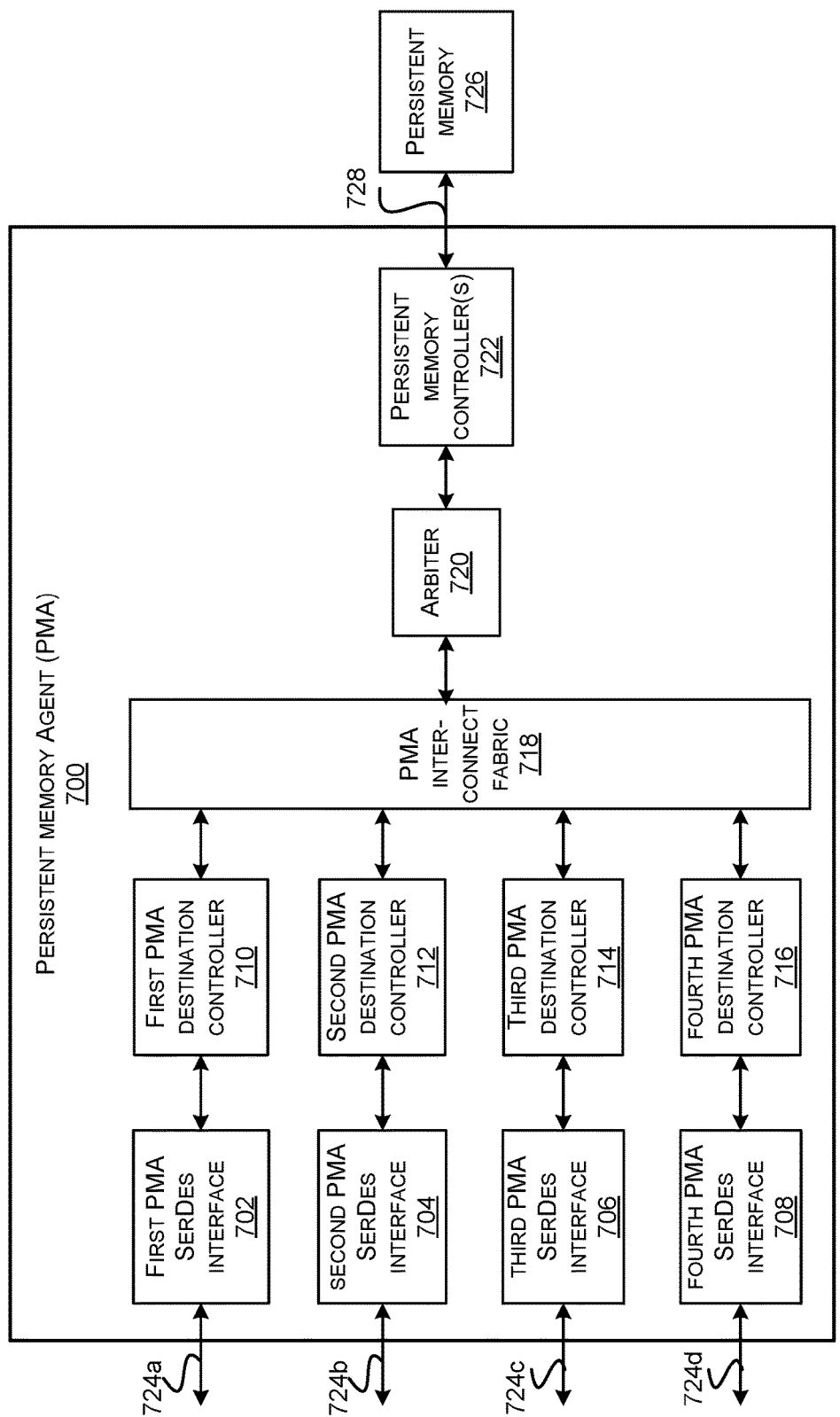
FIG. 7 illustrates an example block diagram for a persistent memory agent (PMA) coupled to a persistent memory, in one embodiment of the disclosed technologies.

FIG. 7 illustrates an example block diagram for a persistent memory agent (PMA) 700 coupled to a persistent memory 726, in one embodiment of the disclosed technologies. The PMA 700 may be similar to the MA 206, type 2 MA 310, first PMA 418, second PMA 420, or the third PMA 422, as discussed with reference to FIGS. 2-4.

The persistent memory agent 700 may include multiple PMA SerDes interfaces, e.g., a first PMA SerDes interface 702, a second PMA SerDes interface 704, a third PMA SerDes interface 706, and a fourth PMA SerDes interface 708. The PMA 700 may also include multiple PMA destination controllers, e.g., a first PMA destination controller 710, a second PMA destination controller 712, a third PMA destination controller 714, and a fourth PMA destination controller 716, which may be coupled to a PMA interconnect fabric 718. The PMA 700 may also include an arbiter 720 coupled to the PMA interconnect fabric 718. The PMA 700 may further include one or more persistent memory controllers 722 configured to communicate with the persistent memory 726 using an interface 728. For example, the interface 728 may include a bus or a memory channel suitable for communication between the persistent memory controllers 722 and the persistent memory 726. It will be understood that the PMA 700 can include more or fewer numbers of PMA SerDes interfaces, PMA destination controllers, arbiters, and persistent memory controllers than shown in FIG. 7 based on the number of SoCs coupled to the PMA 700, without deviating from the scope of the disclosure.

The persistent memory 726 may be shared by all the SoCs coupled to the PMA 700, e.g., using respective SerDes interfaces. In some implementations, the persistent memory 726 may include storage class memory, e.g., a NAND flash, and the one or more persistent memory controllers 722 may include storage class memory (SCM) controller(s). For example, the storage class memory may combine the benefits of fast access time of DRAMs with high storage capacity of flash memory. In some implementations, the storage class memory may reside on a memory bus and can provide low latency and non-volatile memory storage. In some embodiments, the persistent memory 726 may be in the form of a non-volatile dual in-line memory module (NVDIMM) comprising DDR4 and NAND flash. Note that the embodiments can support other possible forms of persistent memory storage.

Each of the first PMA SerDes interface 702, second PMA SerDes interface 704, third PMA SerDes interface 706, and the fourth PMA SerDes interface 708 may be configured to communicate with a corresponding SoC SerDes interface of a given SoC from a plurality of SoCs coupled to the PMA 700 via a respective communication link. For example, the first PMA SerDes interface 702 may communicate with a second SoC SerDes interface of a first SoC via a communication link 724a, the second PMA SerDes interface 704 may communicate with a second SoC SerDes interface of a second SoC via a communication link 724b, the third PMA SerDes interface 706 may communicate with a second SoC SerDes interface of a third SoC via a communication link 724c, and the fourth PMA SerDes interface 708 may communicate with a second SoC SerDes interface of a fourth SoC via a communication link 724d. For example, in one embodiment, the first PMA 418, second PMA 420, and the third PMA 422, as discussed with reference to FIG. 4, may be similar to the PMA 700. Thus, the PMA 700 may be coupled to the first SoC 402, second SoC 404, third SoC 406, and the fourth SoC 408. In one implementation, referring back to FIG. 4, the communication link 724a can be the second communication link 426a for the first SoC 402, the communication link 724b can be the second communication link 426b for the second SoC 404, the communication link 724c can be the second communication link 426c for the third SoC 406, and the communication link 724d can be the second communication link 426d for the fourth SoC 408.

In some embodiments, an amount of bandwidth that each port interfacing with an SoC can be allowed to consume from a total bandwidth supported by the PMA 700 can be configured. For example, the PMA 700 may include one or more bandwidth regulators to regulate bandwidth consumed by each port of the PMA 700 interfacing with the respective SoC via the respective communication link. In one implementation, each of the first PMA SerDes interface 702, second PMA SerDes interface 704, third PMA SerDes interface 706, and the fourth PMA SerDes interface 708 may include a respective memory mapped bandwidth regulator register (not shown) to control the bandwidth consumed by the respective port interfacing with the first SoC 402, second SoC 404, third SoC 406 and the fourth SoC 408 respectively. In another implementation, a central bandwidth regulator may be used to regulate the bandwidth for all the ports interfacing with the SoCs. Bandwidth regulation can provide fairness among multiple ports interfacing with the SoCs so that one SoC does not consume all the bandwidth supported by the PMA 700.

Each of the first PMA SerDes interface 702, second PMA SerDes interface 704, third PMA SerDes interface 706, and the fourth PMA SerDes interface 708 may include an SIPO module and a PISO module. For example, the SIPO module in the first PMA SerDes interface 702 may receive serial data from the first SoC 402 over the communication link 724a for a first transaction with the persistent memory 726, and de-serialize the data into a parallel interface to be used by the first PMA destination controller 710. The serial data may include data, an address and controls for a write transaction to the persistent memory 726, or address and controls for a read transaction from the persistent memory 726. The PISO module in the first PMA SerDes interface 702 may receive data via the parallel interface from the first PMA destination controller 710 in response to the first transaction and serialize the data to be sent to the first SoC 402 over the communication link 724a. The data from the parallel interface may include data read from the persistent memory 726 for the read transaction or a write response for the write transaction. Similarly, the SIPO module and the PISO module in the second PMA SerDes interface 704 may communicate with the second SoC 404 over the communication link 724b for a second transaction with the persistent memory 726, the SIPO module and the PISO module in the third PMA SerDes interface 706 may communicate with the third SoC 406 over the communication link 724c for a third transaction with the persistent memory 726, and the SIPO module and the PISO module in the fourth PMA SerDes interface 708 may communicate with the fourth SoC 408 over the communication link 724d for a fourth transaction with the persistent memory 726.

Each of the first PMA destination controller 710, second PMA destination controller 712, third PMA destination controller 714, and the fourth PMA destination controller 716 may be configured to control the destination of the respective transaction. For example, since each of the first SoC 402, second SoC 404, third SoC 406, or the fourth SoC 408 can have global addressability to the persistent memory 726, each of the first PMA destination controller 710, second PMA destination controller 712, third PMA destination controller 714, and the fourth PMA destination controller 716 can direct the destination of the transaction request from any of the SoCs to the arbiter 720 via the PMA interconnect fabric 718. The PMA interconnect fabric 718 may provide an internal fabric to the PMA 700 for routing the data received from the destination controllers to the arbiter 720. The PMA interconnect fabric 718 may include an AXI® interconnect fabric or any suitable fabric without deviating from the scope of the disclosure.

The arbiter 720 may be configured to allow access to the persistent memory 726 shared by all the SoCs, e.g., the SoC 402, SoC 404, SoC 406 and SoC 408, based on arbitration. The arbitration may be based on priority (fixed or programmable), a round robin algorithm, or any suitable policy. In some implementations, the arbiter 720 may be integrated with the persistent memory controller 722.

The one or more persistent memory controllers 722 may be configured to communicate with the persistent memory 726 via the interface 728 to perform a memory write or read access for the transaction requested by the respective SoC. For the write access, data provided by the source SoC can be written into the persistent memory 726 at the address specified by the source SoC. For the read access, the data can be read by the respective persistent memory controller and can be sent back to the source SoC via the respective PMA SerDes interface. For example, the persistent memory controller 722 may receive the transaction request from the arbiter 720 and may communicate accordingly with the persistent memory 726 using suitable chip select, address bus, data bus, read or write control signals, and any relevant signals. The transaction request may be received by the arbiter 720 from the first PMA destination controller 710, second PMA destination controller 712, third PMA destination controller 714, or the fourth PMA destination controller 716 via the PMA interconnect fabric 718. Thus, in some embodiments, when one of the SoCs is unavailable due to failure or low power mode, the persistent memory 726 can still be accessible to the other SoCs via their respective SerDes links.

Figure 8:
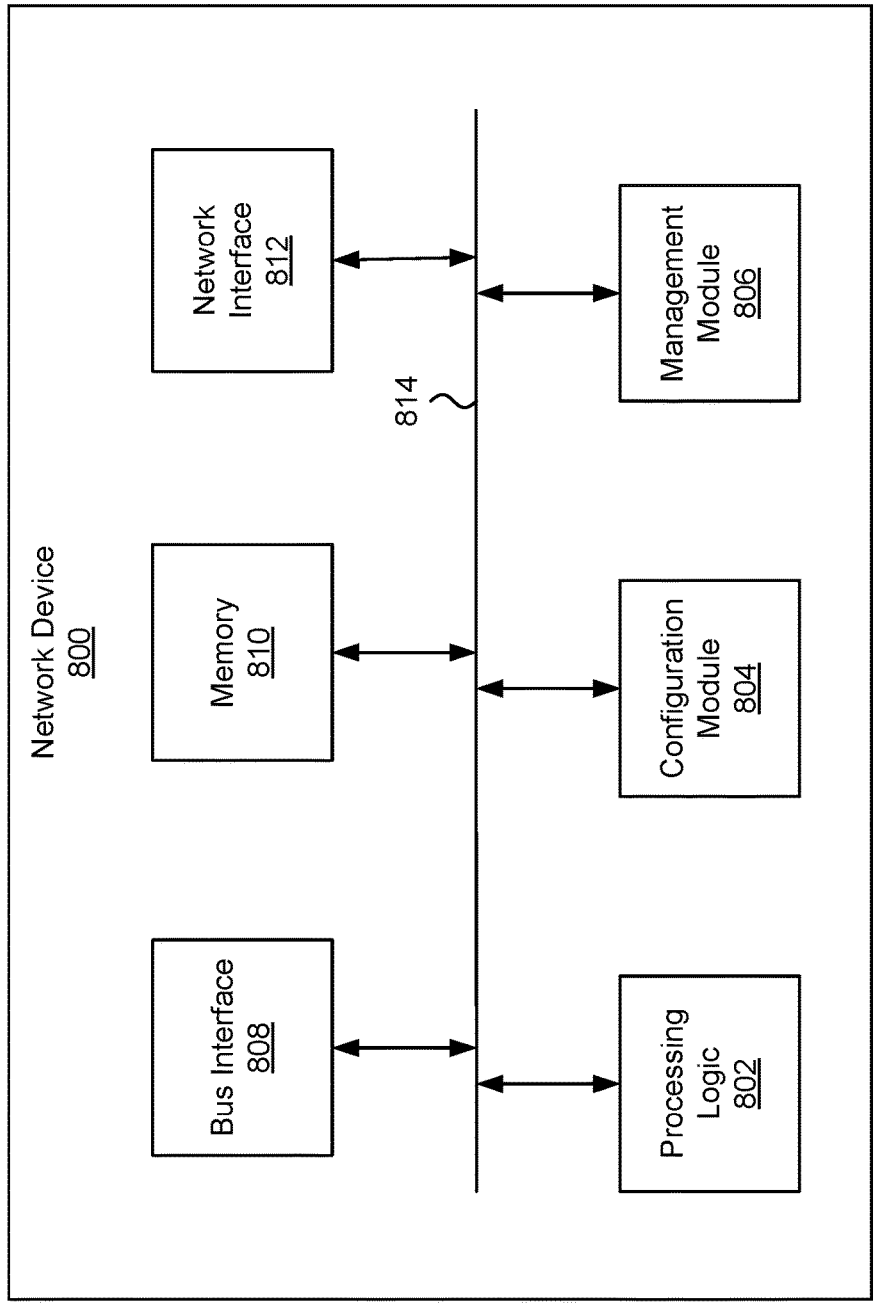
FIG. 8 illustrates an example of a network device, according to certain aspects of the disclosure.

FIG. 8 illustrates an example of a network device 800. Functionality and/or several components of the network device 800 may be used without limitation with other embodiments disclosed elsewhere in this disclosure, without limitations. A network device 800 may facilitate processing of packets and/or forwarding of packets from the network device 800 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 800 may be the recipient and/or generator of packets. In some implementations, the network device 800 may modify the contents of the packet before forwarding the packet to another device. The network device 800 may be a peripheral device coupled to another computer device, a switch, a router or any other suitable device enabled for receiving and forwarding packets.

In one example, the network device 800 may include processing logic 802, a configuration module 804, a management module 806, a bus interface module 808, memory 810, and a network interface module 812. These modules may be hardware modules, software modules, or a combination of hardware and software. In certain instances, modules may be interchangeably used with components or engines, without deviating from the scope of the disclosure. The network device 800 may include additional modules, not illustrated here, such as components discussed with respect to the nodes disclosed in FIG. 9. In some implementations, the network device 800 may include fewer modules. In some implementations, one or more of the modules may be combined into one module. One or more of the modules may be in communication with each other over a communication channel 814. The communication channel 814 may include one or more busses, meshes, matrices, fabrics, a combination of these communication channels, or some other suitable communication channel.

The processing logic 802 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 802 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 802 may be stored on a computer-readable storage medium, for example, in the form of a computer program. The computer-readable storage medium may be non-transitory. In some cases, the computer-readable medium may be part of the memory 810. In some implementations, the processing logic 802 may include the SoCs, as discussed with reference to FIG. 2A, FIG. 2B, FIG. 3 or FIG. 4. For example, in accordance with certain embodiments, the SoCs may communicate with the memory 810 via their respective memory agents (not shown).

The memory 810 may include either volatile or non-volatile, or both volatile and non-volatile types of memory. The memory 810 may, for example, include random access memory (RAM), read only memory (ROM), Electrically Erasable Programmable Read-Only Memory (EEPROM), flash memory, and/or some other suitable storage media. In some cases, some or all of the memory 810 may be internal to the network device 800, while in other cases some or all of the memory may be external to the network device 800. The memory 810 may store an operating system comprising executable instructions that, when executed by the processing logic 802, provides the execution environment for executing instructions providing networking functionality for the network device 800. The memory may also store and maintain several data structures and routing tables for facilitating the functionality of the network device 800.

In some implementations, the configuration module 804 may include one or more configuration registers. Configuration registers may control the operations of the network device 800. In some implementations, one or more bits in the configuration register can represent certain capabilities of the network device 800. Configuration registers may be programmed by instructions executing in the processing logic 802, and/or by an external entity, such as a host device, an operating system executing on a host device, and/or a remote device. The configuration module 804 may further include hardware and/or software that control the operations of the network device 800.

In some implementations, the management module 806 may be configured to manage different components of the network device 800. In some cases, the management module 806 may configure one or more bits in one or more configuration registers at power up, to enable or disable certain capabilities of the network device 800. In certain implementations, the management module 806 may use processing resources from the processing logic 802. In other implementations, the management module 806 may have processing logic similar to the processing logic 802, but segmented away or implemented on a different power plane than the processing logic 802.

The bus interface module 808 may enable communication with external entities, such as a host device and/or other components in a computing system, over an external communication medium. The bus interface module 808 may include a physical interface for connecting to a cable, socket, port, or other connection to the external communication medium. The bus interface module 808 may further include hardware and/or software to manage incoming and outgoing transactions. The bus interface module 808 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 808 may include the physical layer for any of these bus protocols, including a connector, power management, and error handling, among other things. In some implementations, the network device 800 may include multiple bus interface modules for communicating with multiple external entities. These multiple bus interface modules may implement the same local bus protocol, different local bus protocols, or a combination of the same and different bus protocols.

The network interface module 812 may include hardware and/or software for communicating with a network. This network interface module 812 may, for example, include physical connectors or physical ports for wired connection to a network, and/or antennas for wireless communication to a network. The network interface module 812 may further include hardware and/or software configured to implement a network protocol stack. The network interface module 812 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 800 may include multiple network interface modules, each configured to communicate with a different network. For example, in these implementations, the network device 800 may include a network interface module for communicating with a wired Ethernet network, a wireless 802.11 network, a cellular network, an Infiniband network, etc.

The various components and modules of the network device 800, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 9.

Figure 9:
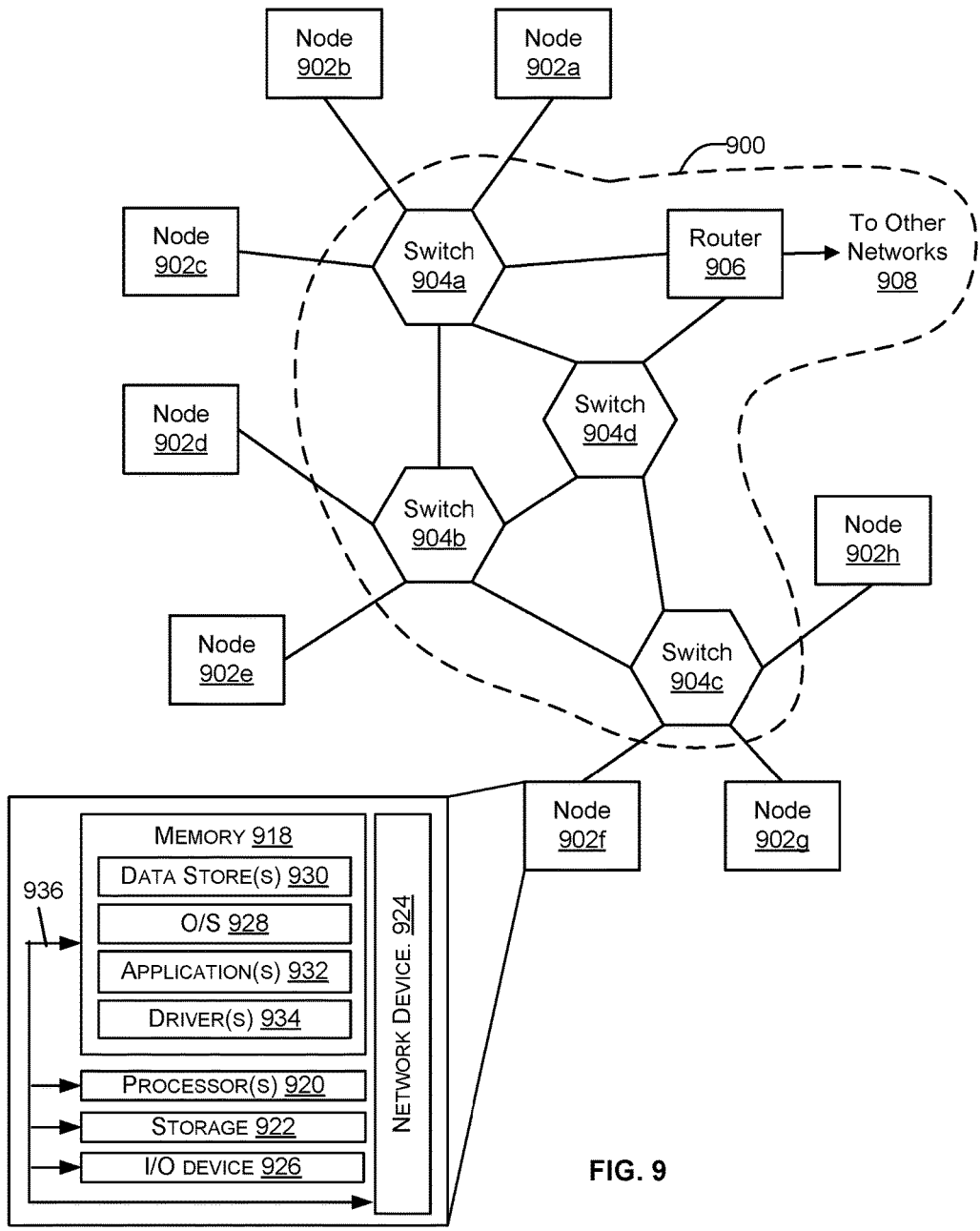
FIG. 9 illustrates an example architecture for features and systems described herein that includes one or more service provider computers and/or a user device connected via one or more networks, according to certain aspects of the disclosure.

FIG. 9 illustrates a network 900, illustrating various different types of network devices 800 of FIG. 8, such as nodes comprising the network device, switches and routers. In certain embodiments, the network 900 may be based on a switched architecture with point-to-point links. As illustrated in FIG. 9, the network 900 includes a plurality of switches 904a-904d, which may be arranged in a network. In some cases, the switches are arranged in a multi-layered network, such as a Clos network. A network device 800 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 904a-904d may be connected to a plurality of nodes 902a-902h and provide multiple paths between any two nodes.

The network 900 may also include one or more network devices 800 for connection with other networks 908, such as other subnets, LANs, wide area networks (WANs), or the Internet, and may be referred to as routers 906. Routers use headers and forwarding tables to determine the best path for forwarding the packets, and use protocols such as internet control message protocol (ICMP) to communicate with each other and configure the best route between any two devices.

In some examples, network(s) 900 may include any one or a combination of many different types of networks, such as cable networks, the Internet, wireless networks, cellular networks and other private and/or public networks. Interconnected switches 904a-904d and router 906, if present, may be referred to as a switch fabric, a fabric, a network fabric, or simply a network. In the context of a computer network, terms "fabric" and "network" may be used interchangeably herein.

Nodes 902a-902h may be any combination of host systems, processor nodes, storage subsystems, and I/O chassis that represent user devices, service provider computers or third party computers.

User devices may include computing devices to access an application 932 (e.g., a web browser or mobile device application). In some aspects, the application 932 may be hosted, managed, and/or provided by a computing resources service or service provider. The application 932 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 908. Additionally, the user device(s) may be part of the distributed system managed by, controlled by, or otherwise part of the service provider computer(s) (e.g., a console device integrated with the service provider computers).

The node(s) of FIG. 9 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 932 and/or cloud-based software services. These servers may be configured as part of an integrated, distributed computing environment. In some embodiments, the apparatus discussed with reference to FIG. 2A, FIG. 2B, FIG. 3 or FIG. 4 may be part of the service provider computer. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 902a-902h may include at least one memory 918 and one or more processing units (or processor(s) 920). The processor(s) 920 may be implemented in hardware, computer-executable instructions, firmware, or combinations thereof. Computer-executable instruction or firmware implementations of the processor(s) 920 may include computer-executable or machine-executable instructions written in any suitable programming language to perform the various functions described.

In some instances, the hardware processor(s) 920 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 918 may store program instructions that are loadable and executable on the processor(s) 920, as well as data generated during the execution of these programs. Depending on the configuration and type of the node(s) 902a-902h, the memory 918 may be volatile (such as RAM) and/or non-volatile (such as ROM, flash memory, etc.). The memory 918 may include an operating system 928, one or more data stores 930, one or more application programs 932, one or more drivers 934, and/or services for implementing the features disclosed herein.

The operating system 928 may support nodes 902a-902h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 928 may also be a proprietary operating system.

The data stores 930 may include permanent or transitory data used and/or operated on by the operating system 928, application programs 932, or drivers 934. Examples of such data include web pages, video data, audio data, images, user data, and so on. The information in the data stores 930 may, in some implementations, be provided over the network(s) 908 to user devices 904. In some cases, the data stores 930 may additionally or alternatively include stored application programs and/or drivers. Alternatively or additionally, the data stores 930 may store standard and/or proprietary software libraries, and/or standard and/or proprietary application user interface (API) libraries. Information stored in the data stores 930 may be machine-readable object code, source code, interpreted code, or intermediate code.

The drivers 934 include programs that may provide communication between components in a node. For example, some drivers 934 may provide communication between the operating system 928 and additional storage 922, network device 924, and/or I/O device 926. Alternatively or additionally, some drivers 934 may provide communication between application programs 932 and the operating system 928, and/or application programs 932 and peripheral devices accessible to the service provider computer. In many cases, the drivers 934 may include drivers that provide well-understood functionality (e.g., printer drivers, display drivers, hard disk drivers, Solid State Device drivers). In other cases, the drivers 934 may provide proprietary or specialized functionality.

The service provider computer(s) or servers may also include additional storage 922, which may include removable storage and/or non-removable storage. The additional storage 922 may include magnetic storage, optical disks, solid state disks, flash memory, and/or tape storage. The additional storage 922 may be housed in the same chassis as the node(s) 902a-902h or may be in an external enclosure. The memory 918 and/or additional storage 922 and their associated computer-readable media may provide non-volatile storage of computer-readable instructions, data structures, program modules, and other data for the computing devices. In some implementations, the memory 918 may include multiple different types of memory, such as SRAM, DRAM, or ROM.

The memory 918 and the additional storage 922, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 918 and the additional storage 922 are examples of computer storage media. Additional types of computer storage media that may be present in the node(s) 902a-902h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 902a-902h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 902a-902h may also include I/O device(s) 926, such as a keyboard, a mouse, a pen, a voice input device, a touch input device, a display, speakers, a printer, and the like. The node(s) 902a-902h may also include one or more communication channels 936. A communication channel 936 may provide a medium over which the various components of the node(s) 902a-902h can communicate. The communication channel or channels 936 may take the form of a bus, a ring, a switching fabric, or a network.

The node(s) 902a-902h may also contain network device(s) 924 that allow the node(s) 902a-902h to communicate with a stored database, another computing device or server, user terminals and/or other devices on the network(s) 900. The network device(s) 924 of FIG. 9 may include similar components discussed with reference to the network device 800 of FIG. 8.

In some implementations, the network device 924 is a peripheral device, such as a PCI-based device. In these implementations, the network device 924 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 808 may implement NVMe, and the network device 924 may be connected to a computing system using a PCIe interface.

A PCI-based device may include one or more functions. A "function" describes operations that may be provided by the network device 924. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 924 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 8, FIG. 9, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A server computer, comprising:
a plurality of system on chips (SoCs), each SoC comprising a respective processor and a respective plurality of SoC point-to-point interconnect interfaces;
a plurality of memory agents (MAs), each MA communicatively coupled to a respective volatile memory, each MA comprising a respective memory controller configured to communicate with the respective volatile memory, each MA configured to communicate with each of the SoCs via a corresponding MA point-to-point interconnect interface, wherein any portion of the volatile memory is accessible by any of the SoCs via any of the respective MAs coupled to the volatile memory being accessed; and
a plurality of persistent memory agents (PMAs), each PMA communicatively coupled to a respective persistent memory, each PMA comprising a respective persistent memory controller configured to communicate with the respective persistent memory, each PMA configured to communicate with each of the SoCs via a corresponding PMA point-to-point interconnect interface, wherein any portion of the persistent memory is accessible by any of the SoCs via any of the respective PMAs coupled to the persistent memory being accessed.

2. The server computer of claim 1, wherein the volatile memory is a double data rate (DDR) synchronous random access memory (SDRAM) and the persistent memory is a storage class memory (SCM).

3. The server computer of claim 1, wherein any portion of the volatile memory is accessible by each of the SoCs via any of the MAs in uniform number of hops.

4. The server computer of claim 1, wherein any portion of the persistent memory is accessible by each of the SoCs via any of the PMAs in uniform number of hops.

5. An apparatus, comprising:
a first semiconductor device comprising a first processor and a first device point-to-point interconnect interface;

a second semiconductor device comprising a second processor and a second device point-to-point interconnect interface; and a memory agent (MA) comprising:
- a first MA point-to-point interconnect interface to communicate with the first device point-to-point interconnect interface over a first communication link;
- a second MA point-to-point interconnect interface to communicate with the second device point-to-point interconnect interface over a second communication link; and
- a memory controller coupled to a memory, wherein the memory is accessible by the first semiconductor device and the second semiconductor device via the MA across an interconnect fabric.

6. The apparatus of claim 5, wherein the memory is volatile memory.

7. The apparatus of claim 5, wherein the memory is double data rate (DDR) synchronous random access memory (SDRAM), and the memory controller is a DDR controller.

8. The apparatus of claim 5, wherein the memory is persistent memory.

9. The apparatus of claim 5, wherein the memory is storage class memory (SCM) and the memory controller is an SCM controller.

10. The apparatus of claim 5, wherein each of the first device point-to-point interconnect interface, second device point-to-point interconnect interface, first MA point-to-point interconnect interface, and the second MA point-to-point interconnect interface include a respective Serializer/De-Serializer (SerDes) interface.

11. The apparatus of claim 5, wherein the MA is a type 1 MA, the memory controller is a type 1 memory controller, the memory is a type 1 memory, the interconnect fabric is a first interconnect fabric, and wherein the first semiconductor device further comprises a third device point-to-point interconnect interface and the second semiconductor device further comprises a fourth device point-to-point interconnect interface, the apparatus further comprising:

a type 2 MA comprising:
- a first type 2 MA point-to-point interconnect interface to communicate with the third device point-to-point interconnect interface of the first semiconductor device over a third communication link;
- a second type 2 MA point-to-point interconnect interface to communicate with the fourth device point-to-point interconnect interface of the second semiconductor device over a fourth communication link; and
- a type 2 memory controller coupled to a type 2 memory, wherein the type 2 memory is accessible by the first semiconductor device and the second semiconductor device via the type 2 MA across a second interconnect fabric.

12. The apparatus of claim 11, wherein the type 1 memory is volatile memory and the type 2 memory is persistent memory.

13. The apparatus of claim 11, wherein the type 1 memory is accessible by the first semiconductor device and the second semiconductor device via the type 1 MA in a uniform number of hops.

14. The apparatus of claim 11, wherein the type 2 memory is accessible by the first semiconductor device and the second semiconductor device via the type 2 MA in a uniform number of hops.

15. The apparatus of claim 11, wherein the type 1 MA is mapped to a first portion of a memory address range for the first processor of the first semiconductor device and the type 2 MA is mapped to a second portion of the memory address range for the first processor of the first semiconductor device.

16. The apparatus of claim 15, wherein the mapping of the type 1 MA and the mapping of the type 2 MA are performed using a hash function.

17. The apparatus of claim 5, wherein the first semiconductor device is a first system on chip (SoC) and the second semiconductor device is a second SoC.

18. The apparatus of claim 5, wherein both the first semiconductor device and the second semiconductor device are part of a same package.

19. A semiconductor device, comprising:
- a first memory agent (MA) Serializer/De-Serializer (SerDes) hardware interface to form a first serial link with a first system on chip (SoC) SerDes interface of a first SoC while the MA is mapped to a first memory address range associated with the first SoC;
- a second MA SerDes hardware interface to form a second serial link with a second SoC SerDes interface of a second SoC while the MA is also mapped to a second memory address range associated with the second SoC; and
- a memory controller to communicate with a memory coupled to the MA and to make the memory accessible by the first SoC and the second SoC via the MA across an interconnect fabric.

20. The semiconductor device of claim 19, further comprising a bandwidth regulator to regulate a first bandwidth, out of a total bandwidth supported by the MA, consumed by a first port of the MA interfacing with the first SoC via the first serial link, and to regulate a second bandwidth, out of the total bandwidth supported by the MA, consumed by a second port of the MA interfacing with the second SoC via the second serial link.

* * * * *